United States Patent
Shiimado et al.

(10) Patent No.: US 6,725,144 B2
(45) Date of Patent: Apr. 20, 2004

(54) CONTROL APPARATUS AND APPLICABLE CONTROL METHOD AND CONTROL PROGRAM FOR VEHICLE

(75) Inventors: Toshihiro Shiimado, Anjo (JP); Kazuomi Okasaka, Anjo (JP); Yuuji Imanaga, Anjo (JP); Tadashi Tamura, Toyota (JP); Daisuke Inoue, Toyota (JP); Hiroji Taniguchi, Toyota (JP); Fumiharu Ogawa, Hekinan (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/321,352

(22) Filed: Dec. 18, 2002

(65) Prior Publication Data

US 2003/0130779 A1 Jul. 10, 2003

(30) Foreign Application Priority Data

Dec. 28, 2001 (JP) ........................ 2001-402054

(51) Int. Cl.[7] ................................ G06F 7/00
(52) U.S. Cl. ........................... 701/65; 701/51
(58) Field of Search .................. 701/65, 51, 61, 701/64, 55; 477/34

(56) References Cited

U.S. PATENT DOCUMENTS 6,496,771 B2 * 12/2002 Hattori et al. ............... 701/96

FOREIGN PATENT DOCUMENTS

JP     A 8-261303    10/1996
JP     A 11-230322    8/1999

* cited by examiner

Primary Examiner—Yonel Beaulieu
(74) Attorney, Agent, or Firm—Oliff & Berridge, PLC

(57) ABSTRACT

A vehicle control apparatus including an automatic transmission which changes a speed of rotation of an input shaft drivingly connected to a driving source and outputs the rotation of the input shaft to an output shaft, and a shift execution device that executes shifting of the automatic transmission, including a shift control device that calculates a predetermined target input shaft rotation number based on road information and vehicle state information, and controls an input shaft rotation number such that the input shaft rotation number becomes equal to the predetermined target input shaft rotation number, by executing shifting of the shift execution device; and a shifting speed setting device that sets a shifting speed, when control based on the road information begins after switching from control based on the vehicle state information by the shift control device, to a predetermined shifting speed such that shifting is executed rapidly, and sets the shifting speed, when shifting needs to be executed during the control based on the road information by the shift control device, such that the shifting speed is lower than the predetermined shifting speed.

20 Claims, 14 Drawing Sheets

CONTROL APPARATUS AND APPLICABLE CONTROL METHOD AND CONTROL PROGRAM FOR VEHICLE

The disclosure of Japanese Patent Application No. 2001-402054 filed Dec. 28, 2001 including the specification, drawings and claims is incorporated herein by reference in its entirety.

BACKGROUND OF THE INVENTION

1. Field of Invention

The invention relates to a vehicle control apparatus, a control method and a control program which can execute control of shifting of an automatic transmission apparatus capable of changing a speed of rotation of a driving source and outputting this rotation, in accordance with road information and vehicle state information.

2. Description of Related Art

Conventionally, in order to control engine braking force in accordance with the expectations of a driver with respect to the condition of the road the vehicle is running on, a vehicle control apparatus or so-called navigation assisted shift control has been proposed. This type of vehicle control apparatus for controlling an automatic transmission based on information concerning the road ahead, and the like, detected by a navigation device, is disclosed in Japanese Patent Laid-Open Publication No. 11-230322.

The disclosed navigation assisted shift control mentioned above calculates a predetermined target input shaft rotation number such that engine brake is applied in accordance with the road information. The road information includes information concerning the road configuration (for example, corner shape, road gradient) detected by a navigation device, road condition (for example, degree of road surface smoothness, snow fall) detected by various sensors, and operating condition (for example, vehicle speed, intentions of the driver with respect to deceleration), and the like. The navigation assisted shift control uses the predetermined target to control a shift ratio and a shifting speed of a continuous variable transmission (CVT), such that the engine braking force accords with the expectations of the driver. As a result, the drivability of the vehicle is improved, and in particular, the stability of the vehicle when driving around corners and curves is improved (so-called cornering control is executed).

SUMMARY OF THE INVENTION

However, for example, when a vehicle enters a first corner from a straight road, the driver can see the first corner at an early stage. Thus, it is comparatively easy for the driver to realize that a corner exists prior to entering the first corner. On the other hand, for example, in the case of a road which has two corners or more in close succession, it is difficult to see the second corner and subsequent corners that will be entered, as the distance between the corners is short, and/or there may be obstructions, such as buildings and the like. As a result, it is difficult to see that next corner at an early stage. Thus, before entering the next corner, the driver may not realize that there is a corner ahead early enough, or indeed, may not realize the corner exists at all.

Moreover, in the case of the shifting speed of the navigation assisted shift control, the magnitude of the shifting speed with respect to the aforementioned information concerning operating state, and the like, is set in advance. Accordingly, in the case of entering the first corner from the straight road, even if the driver realizes the first corner exists, the strength of the engine brake obtained may not be in accordance with the expectations of the driver. As a result, the driver, or another occupant, may feel a sense of discomfort.

On the other hand, in the case of entering the second or subsequent corners in the example described above, even when the driver does not realize there is a second corner early enough, or indeed, does not realize that a second corner exists at all, a degree of engine brake which the driver is not expecting (anticipating) is applied. As a result, the driver or the other occupant may feel a sense of discomfort. In addition, as the vehicle continues running around the next corner in the example, the aforementioned unexpected degree of brake engine brake is applied. Accordingly, as the vehicle is turning, a degree of engine brake which is not expected (anticipated) is applied, and as a result the driver or the other occupant may feel a sense of discomfort.

It is an object of the invention to provide a vehicle control apparatus, a control method and a control program which can solve the aforementioned problems which relate to the described related art. In the vehicle control apparatus, the control method and the control program according to the invention, a shifting speed setting device sets a shifting speed to a predetermined shifting speed such that shifting is rapidly executed, when a control by a shift control device is initiated. When shifting needs to be executed during the execution of the control by the shift control device, the shifting speed is set to be lower than the aforementioned predetermined shifting speed.

According to the first aspect of the invention, the shift control device calculates the predetermined target input shaft rotation number based on the road information and the vehicle state information, and controls the input shaft rotation number such that the input shaft rotation number becomes equal to the predetermined target input shaft rotation number, by executing shifting of the shift execution device. Moreover, the shifting speed setting device sets the shifting speed, when control based on the road information begins after switching from control based on the vehicle state information by the shift control device, to the predetermined shifting speed such that shifting is executed rapidly, and sets the shifting speed, when shifting needs to be executed during control based on the road information by the shift control device, such that the shifting speed is lower than the predetermined shifting speed. Accordingly, the control by the shift control device can respond to differences in the expectation of a driver with respect to vehicle acceleration change magnitude, depending on whether it is a time of starting control based on the road information after switching from control based on the vehicle state information, or a time during which control based on road information is in-progress. As a result, it is possible to prevent the driver from feeling a sense of discomfort.

Further, according to the first aspect of the invention, the road information shift control device calculates the predetermined target input shaft rotation number based on the road information, and controls the input shaft rotation number such the input shaft rotation number becomes equal to the predetermined target input shaft rotation number, by executing shifting of the shift execution device. Furthermore, the continuous control detection device detects that shifting needs to be executed while control by the road information shift control device is continued during control by the road information shift control device. Moreover, the shifting speed setting device sets the shifting speed to a predetermined shifting speed such that shifting is executed rapidly when control by the road information shift control device starts, and sets the shifting speed such that the shifting speed is lower than the predetermined shifting speed when shifting needs to be executed during control by the road information control device, based on the detection result of the continuous control detection device. Accordingly, it is possible to detect the need to execute shifting while continuing control by the road information shift control device. As a result, the control by the shift control device can respond to differences in the expectation of the driver with respect to the vehicle acceleration change magnitude, depending on whether the control by the shift control device is starting or in-progress. As a result, it is possible to prevent the driver, or an occupant from feeling a sense of discomfort.

Also, according to the first aspect of the invention, the road information is information which includes at least one of the corner shape and the road gradient. As a result, it is possible to execute control such that the input shaft rotation number becomes equal to the final target input shaft rotation number based on the road information. Accordingly, for example, it is possible to reliably respond to differences in the expectation of the driver with respect to the vehicle acceleration change magnitude, depending on how gentle/sharp the corner is or the upward or downward gradient of the road. In addition, it is possible to slowly execute control of the shift ratio even when, for example, executing control of the shift ratio when running around the corner. Accordingly, it is possible to prevent the driver, or any other occupant, of the vehicle which is in the midst of turning, from feeling any sense of discomfort.

Also, according to the first aspect of the invention, the vehicle state information is information which includes at least one of the accelerator opening degree and the vehicle speed. As a result, it is possible to execute control such that the input shaft rotation number becomes equal to the predetermined target input shaft rotation number based on the road information. Accordingly, it is possible to reliably respond to differences in the expectation of the driver with respect to the vehicle acceleration change magnitude, depending on, for example, the accelerator opening degree or the magnitude of the vehicle speed.

Also, according to the first aspect of the invention, the road information control detection device detects the execution of control by the road information shift control device. Moreover, the continuous control detection device detects that shifting needs to be executed while control by the road information shift control device is continued, based on the detection result of the road information control detection device. As a result, it is possible to detect the need to continue control by the road information shift control device, by the actual execution of control by the road information shift control device.

Also, according to the first aspect of the invention, the downshift control detection device detects execution of the downshift control by the road information shift control device. Moreover, the continuous control detection device detects the need to decelerate while continuing downshift control by the road information shift control device, based on the detection result of the downshift control detection device. In addition, the shifting speed setting device sets the shifting speed, when control by the road information shift control device starts, to the predetermined shifting speed such that shifting is executed rapidly, and sets the shifting speed, when it is necessary to decelerate during control by the road information shift control device, such that the shifting speed is lower than the predetermined shifting speed, based on the detection result of the continuous control detection device. As a result, it is possible to rapidly decelerate when it is necessary to decelerate during control by the road information shift control device. Accordingly, it is possible to apply engine brake in accordance with the expectation of the driver.

Also, according to the first aspect of the invention, the shifting speed setting device sets the shifting speed on the occasion of executing upshift control, when the downshift control by the road information shift control device is completed and the corner is passed, such that the shifting speed is lower than the normal shifting speed. As a result, when returning from downshift control by the road information shift control device, the upshift is executed in a slow manner, and it is possible to satisfy the acceleration requirements expected by the driver. Accordingly, it is possible to prevent the driver or the occupant from feeling any sense of discomfort.

Also, according to the first aspect of the invention, the shift control device calculates the predetermined target input shaft rotation number when the operation indicating the intention of the driver to decelerate is detected. As a result, it is possible to start control by the shift control device based on the deceleration intention of the driver. Accordingly, it is possible to generate vehicle acceleration change in accordance with the expectation of the driver, and thus the driver is prevented from feeling a sense of discomfort.

Also, according to the first aspect of the invention, the ON and the OFF state of the accelerator pedal is detected and the control by the shift control device starts when the OFF state is detected. As a result, it is possible to reliably detect the deceleration of the driver, and thus the control by the shift control device can be started based on the deceleration intention of the driver.

Also, according to the first aspect of the invention, the opening degree of the throttle valve is detected and the control by the shift control device starts when the predetermined opening degree of the throttle valve is detected. As a result, it is possible to reliably detect the deceleration of the driver, and thus the control by the shift control device can be started based on the deceleration intention of the driver.

Also, according to the first aspect of the invention, the shift control device calculates the target input shaft rotation number which is intermittently calculated at the start of calculation based on the road information, after switching from the predetermined target input shaft rotation number calculated based on vehicle state information to the predetermined target input shaft rotation number calculated based on the road information. Alternatively, the shift control device calculates the target input shaft rotation number which is intermittently calculated during the continuation of the control based on the road information, within a predetermined time once the input shaft rotation number has reached substantially the predetermined target input shaft rotation number. Furthermore, the shifting speed setting device may set the shifting speed to the predetermined shifting speed before the input shaft rotation number reaches substantially the target input shaft rotation for when the control based on the road information is started. In addition, when it is necessary to execute control such that the input shaft rotation number becomes equal to the target input shaft rotation number during the continuation of control using the road information, it is determined that shifting needs to be executed during execution of continuous control by the shift control device, and the shifting speed control device sets the shifting speed such that the shifting speed is lower than the predetermined shifting speed. As a result, it is possible to set a shifting speed based on the control state of the input shaft rotation number which is in accordance with the predetermined target input shaft rotation number calculated based on the vehicle state information or the road information. Accordingly, it is possible to reliably respond to differences in the expectation of the driver with respect to vehicle acceleration change magnitude, depending on the vehicle state information or the road information.

According to the second aspect of the invention, the shift control device calculates the predetermined target input shaft rotation number with respect to the first specified corner based on road information and vehicle state information, and controls the input shaft rotation number such that the input shaft rotation number becomes equal to the predetermined target input shaft rotation number, by executing shifting of the shift execution device. Moreover, the continuous control corner detection device detects the second specified corner requiring control by the shift control device to be continued during control by the shift control device with respect to the first specified corner. Furthermore, the shifting speed setting device sets the shifting speed, based on the detection result of the continuous control corner detection device, such that the shifting speed for the first specified corner requiring control by the shift control device is different from the shifting speed for the second specified corner requiring control by the shift control device to be continued. As a result, it is possible to set the shifting speed such that it is different depending on whether the corner a vehicle is running around is the first specified corner requiring control by the shift control device or the second specified corner requiring the control by the shift control device to be continued. Accordingly, it is possible to respond to differences in the expectation of the driver with respect to the vehicle acceleration change magnitude for each corner. Thus, the driver is prevented from feeling a sense of discomfort.

Also, according to the second aspect of the invention, the shifting speed setting device sets the shifting speed, based on the detection result of the continuous control corner detection device, to the predetermined shifting speed such that shifting is executed rapidly when the vehicle is running around the first specified corner requiring control by the shift control device, and sets the shifting speed such that the shifting speed is lower than the predetermined shifting speed when the vehicle is running around the second specified corner requiring control by the shift control device to be continued. As a result, when the corner the vehicle is running around is the first specified corner requiring control by the shift control device, it is possible to generate large vehicle acceleration change. Alternatively, when the corner is the second specified corner requiring control by the shift control device to be continued, it is possible to generate a small vehicle acceleration change. Accordingly, it is possible to respond to differences in the expectation of the driver with respect to the vehicle acceleration change magnitude, depending on the corner which the vehicle is running around. As a result, it is possible to prevent the driver feeling a sense of discomfort.

According to the third aspect of the invention, the predetermined target input shaft rotation number is calculated based on the road information and the vehicle information, the input shaft rotation number is controlled such that the input shaft rotation number becomes equal to the predetermined target input shaft rotation number by execution of shifting of the automatic transmission, the shifting speed is set to the predetermined shifting speed such that shifting is executed rapidly when the control of the input shaft rotation number begins, and, the shifting speed is set such that the shifting speed is lower than the predetermined shifting speed when shifting needs to be executed during the control of the input shaft rotation number. As a result, the control by the shift control device can respond to differences in the expectation of the driver with respect to vehicle acceleration change magnitude, depending on whether the control by the shift control device is starting or in-progress. As a result, it is possible to provide a vehicle control method which prevents the driver or an occupant from feeling a sense of discomfort.

According to the fourth aspect of the invention, the vehicle control program causes the vehicle control computer to function as the shift control device which calculates the predetermined target input shaft rotation number based on the road information and the vehicle state information, and controls the input shaft rotation number such that the input shaft rotation number becomes equal to the predetermined target input shaft rotation number, by executing control of the automatic transmission. Furthermore, the vehicle control computer is also caused to function as the shifting speed setting device which sets the shifting speed to the predetermined shifting speed such that shifting is executed rapidly when control by the shift control device starts, and sets the shifting speed such that the shifting speed is lower than the predetermined shifting speed when shifting needs to be executed during the control by the shift control device. As a result, the control by the shift control device can respond to differences in the expectation of the driver with respect to vehicle acceleration change magnitude, depending on whether the control by the shift control device is starting or in-progress. As a result, it is possible to provide a vehicle control program which prevents the driver feeling a sense of discomfort.

For the purposes of this disclosure, device and means may be considered synonyms. Both relate to a computer and its programs and encompass any necessary memory. The device may be implemented solely by circuitry, e.g. hardware, or a combination of hardware and software. Further, in some cases, as defined in the specification, the device/means may include other elements.

BRIEF DESCRIPTION OF THE DRAWINGS

The invention will be described with reference to the drawings, in which.

DETAILED DESCRIPTION OF PREFERRED EMBODIMENTS

Figure 1:
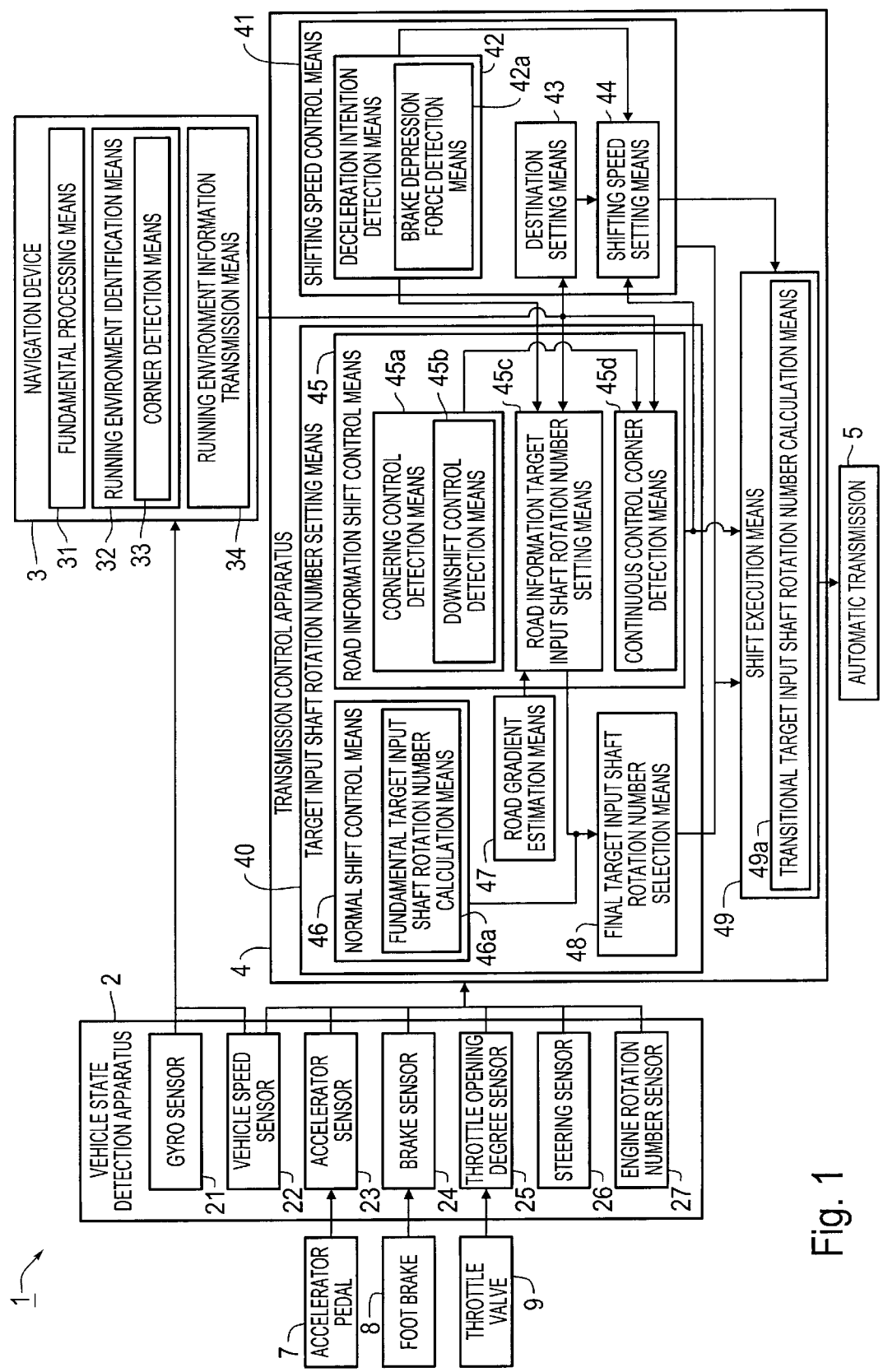
FIG. 1 is a block diagram showing a vehicle control apparatus according to the invention.

Hereinafter, a preferred embodiment of the invention will be described with reference to the drawings. FIG. 1 is a block diagram showing a vehicle control apparatus according to the invention.

The invention which is a vehicle control apparatus 1 and is applied to a vehicle, for example, the vehicle further including a driving source, not shown (for example, an engine, an electric motor, or the like), an accelerator pedal 7, a deceleration device (foot brake) 8, and a throttle valve 9. The vehicle control apparatus 1, which is principally an on-board computer, is provided with a vehicle state detection apparatus 2, a navigation device 3, a transmission control apparatus 4, and an automatic transmission 5 composed from a belt type continuous variable transmission (hereinafter referred to as "CVT 5").

The vehicle state detection apparatus 2 is a device which detects a running state of the vehicle as vehicle state information. In particular, as shown in FIG. 1, the vehicle state detection apparatus 2 is provided with a gyro sensor 21 for detecting a present position based on a directional bearing of the vehicle detected using a vehicle speed and a gyro, not shown; a vehicle speed sensor 22 for detecting a rotation number of an output portion (a secondary pulley 72 shown in FIG. 2) of the CVT 5, an accelerator sensor 23 for detecting both an ON/OFF state and an accelerator opening degree of the accelerator pedal 7; a brake sensor 24 for detecting both whether the foot brake 8 disposed on the driver's side, is being operated, and a size of a pedal depression force based on a pedal depression amount; a throttle opening degree sensor 25 for detecting an opening degree of the throttle valve 9; a steering sensor 26 for detecting a steering angle of a steering wheel, not shown, disposed on the driver's side; and an engine rotation number sensor 27.

In addition, the accelerator pedal 7, the foot brake 8 and the throttle valve 9 are connected to the accelerator sensor 23, the brake sensor 24 and the throttle opening degree sensor 25, respectively. Furthermore, the gyro sensor 21 and the vehicle speed sensor 22 are connected to fundamental processing device 31 of the navigation device 3. Moreover, the vehicle speed sensor 22, the accelerator sensor 23, the brake sensor 24, the throttle opening degree sensor 25, the steering sensor 26, and the engine rotation number sensor 27 are connected to the transmission control apparatus 4, described hereinafter.

The navigation device 3, as shown in FIG. 1, is provided with the fundamental processing means 31. The fundamental processing device 31 detects the present position of the vehicle based on signals from the gyro sensor 21 and a GPS (global positioning system) receiver, not shown, and the like, and executes map plotting based on the present position and road information (the road information includes road shape, such as corners, curves, and the like, road gradient, such as upward or downward gradient of the road, road condition, such as road smoothness and snow fall, and the like). The fundamental processing means 31 also provides route guidance concerning how to reach a destination which is inputted by the driver. The navigation device 3 is further provided with running environment identification means 32 which identifies a running environment, and running environment information transmission means 34 which outputs running environment information. The running environment identification means 32 is provided with corner detection means 33. The corner detection means 33 executes detection of specific corners of the road ahead of the vehicle, executes corner shape judgment processing and calculates a necessary deceleration amount Gr, and the like (running environment information), based on the road information, the present vehicle speed and the present vehicle position. In addition, the navigation device 3 is connected to road information target input shaft rotation number setting means 45c and continuous control corner detection means 45d of a road information shift control device 45, described hereinafter, and connected to destination setting means 43 of shifting speed control means 41.

Furthermore, the road information is stored on a storage medium, such as, for example, a CD-ROM, a DVD-ROM, or a MO disk (alternatively, the information may be transmitted using the internet, or the like, instead of being stored in advance). The road which is the subject of the information is displayed by nodes and lines joining nodes. In addition, the aforementioned running environment information is calculated using detected road information, such as a corner or a curve (hereinafter "corner" will be taken to indicate either a corner or a curve) shape (as will be described hereinafter in more detail).

The transmission control apparatus 4 is provided with the shifting speed control means 41, target input shaft rotation number setting means 40, and shift execution means 49, as shown in FIG. 1. The target input shaft rotation number setting means 40 has the road information shift control means 45 and normal shift control means 46 which are a means for shift control, a road gradient estimation means 47, and a final target input shaft rotation number selection means 48.

The road information shift control means (shift control means) 45 controls an input shaft rotation number based on the road information (for example, the running environment information, and the like, identified by the navigation device 3). In other words, the road information shift control means 45 calculates a predetermined target input shaft rotation number based on the road information. The road information shift control means 45 then executes control for making the input shaft rotation number become equal to the target input shaft revolution number, and maintains the input shaft revolution number at the target input shaft revolution number until the corner is passed (hereinafter referred to as "cornering control"), by executing shifting of an automatic transmission (in this case, the belt type CVT 5). In addition, the road information shift control means 45 is provided with cornering control detection means (road information control detection means) 45a, in addition to the road information target input shaft rotation number setting means 45c and the continuous control corner detection means (continuous control detection means) 45d. The cornering control detection means 45a is provided with downshift control detection means 45b.

Normal shift control means (shift control means) 46 controls the input shaft rotation number based on the vehicle condition information (for example, information concerning the vehicle state, such as the accelerator opening degree and the vehicle speed V, the intentions of the driver with respect to deceleration and acceleration, and driver factors like the degree of vigilance and the experience of the driver). In other words, the shift control means 46 executes normal control of the input shaft rotation number (the engine rotation number) of the CVT 5 in accordance with the accelerator opening degree and the vehicle speed V, based on a predetermined shifting diagram (hereinafter referred to as "normal control"). The shift control means 46 is provided with fundamental target input shaft rotation number calculation means 46a.

The shifting speed control means 41 is provided with deceleration intention detection means 42 and shifting speed setting means 44, in addition to the destination setting means 43. The deceleration intention detection means 42 is provided with brake depression force detection means 42a. In addition the aforementioned shift execution means 49 is provided with transitional target input shaft rotation number calculation means 49a.

In addition, the deceleration intention detection means 42 (the brake depression force detection means 42a) and the road gradient estimation means 47 are connected to the road information target input shaft rotation number setting means 45c. The road information target input shaft rotation number setting means 45c is connected to the normal shift control means 46 (the fundamental target input shaft rotation number calculation means 46a) as well as to the final target input shaft rotation number selection means 48. The cornering control detection means 45a (the downshift control detection means 45b) is connected to the continuous control corner detection means 45d. The continuous control corner detection means 45d is connected to the deceleration intention detection means 42 as well as the shifting speed setting means 44.

In addition, the final target input shaft rotation number selection means 48, the continuous control corner detection means 45d and the shifting speed setting means 44 are connected to the shift execution means 49 (the transitional target input shaft rotation number calculation means 49a). Furthermore, the shift execution means 49 is connected to the CVT (automatic transmission) 5. As a result, shifting is executed by outputting predetermined signals to hydraulic actuators 74 and 76, and the like, described hereinafter, of the CVT 5.

Furthermore, according to this embodiment the cornering control detection means (shift control means) 45a, the shifting speed setting means 44, and the continuous control corner detection means (continuous control detection means) 45d are housed within the transmission control apparatus 4. However, these elements may be housed, for example, within the navigation device 3, or alternatively, may be housed within a control portion that integrates the navigation device 3 and the transmission control apparatus 4.

Figure 2:
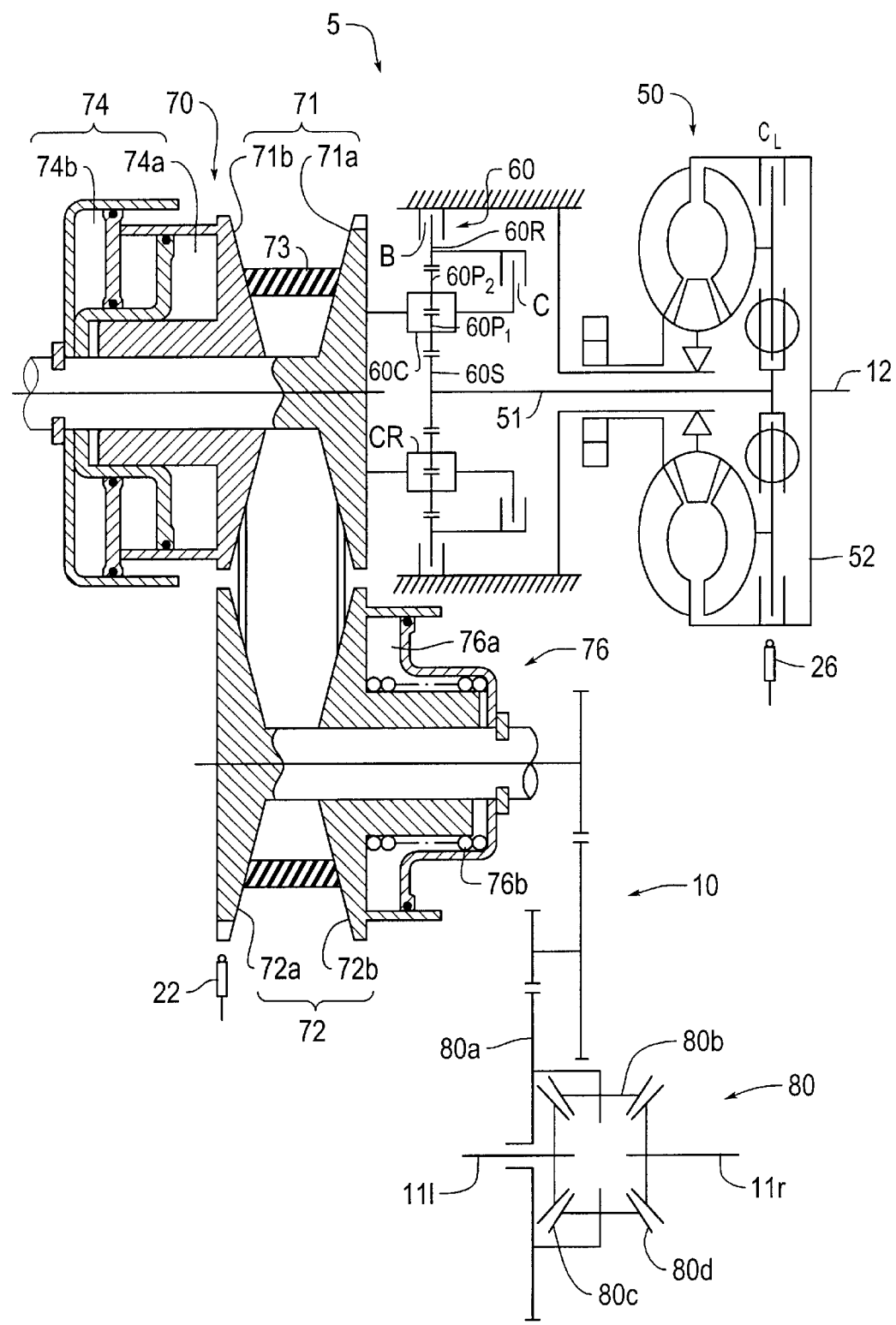
FIG. 2 shows a belt type continuous variable transmission, as one example of a continuous variable transmission.

Next, the CVT 5, to which the embodiment of the invention can be applied, will be explained with reference to FIG. 2. FIG. 2 shows an example of one type of CVT, namely, the belt type CVT. This CVT 5 changes the speed of rotation of an input shaft (hereinafter, this input shaft is equivalent to a crank shaft 12), which is drivingly connected to the driving source (for example, an engine or an electric motor (not shown)), and outputs this rotation to an output shaft. The CVT 5 is provided with a torque converter 50 having an attached lock up clutch $C_L$ as a take-off apparatus, a dual pinion planetary gear 60 which forms a forward-reverse switching apparatus, a belt type continuous variable transmission 70, and a differential apparatus 80. All of these members are housed within a segmented integrated case 13.

The dual pinion planetary gear 60 has a sun gear 60S, a ring gear 60R, and a carrier 60C supporting two pinions $60P_1$ and $60P_2$ which intermesh with the sun gear 60S and the ring gear 60R, respectively. The sun gear 60S is connected to an input shaft 51 of the torque converter 50. The carrier 60C is connected to a primary pulley 71 of the belt type continuous variable transmission 70. In addition, a direct coupling clutch is interposed between the carrier 60C and the ring gear 60R. Furthermore, a brake B for reversing is interposed between the ring gear 60R and the case 13.

The belt type continuous variable transmission 70 is provided with the primary pulley 71, the secondary pulley 72, a metal belt 73 which is looped around the primary pulley 71 and the secondary pulley 72, in addition to the hydraulic actuators 74, 76. The primary pulley 71 and the secondary pulley 72 are respectively formed from fixed sheaves 71a, 72a, and moveable sheaves 71b, 72b.

The hydraulic actuator 74 having double chambers 74a, 74b is disposed at a backside of the moveable sheave 71b on the primary side. Moreover, the hydraulic actuator 76 having a single chamber 76a and a spring 76b for pulley-load is disposed at a backside of the movable sheave 72b on the secondary side. In addition, hydraulic pressure is supplied to the hydraulic actuators 74, 76 such that a belt pinching force that corresponds to load torque is applied and a predetermined shift ratio is obtained. This hydraulic pressure is appropriately regulated by a linear solenoid valve which is disposed in a hydraulic pressure circuit, not shown, and which receives signals from the transmission control apparatus 4. A directional control valve, and the like, are used for switching the hydraulic pressure.

In addition, the differential apparatus 80 is connected to the secondary pulley 72, via a counter gear 10 and a ring gear 80a of the differential apparatus 80. The speed of rotation of the secondary pulley 72 is reduced and is transmitted to the differential apparatus 80. The differential apparatus 80 transmits rotation of the ring gear 80a to left and right side gears 80c, 80d in accordance with respective load, via a differential gear 80b. The side gears 80c, 80d are connected via left and right axles 11l, 11r, respectively, to driving wheels, not shown.

Furthermore, in FIG. 2, the vehicle speed sensor 22 is disposed so as to face the secondary fixed sheave 72a and detects a rotation number of the secondary pulley 72. The engine rotation number sensor 2 is disposed so as to face a torque converter housing 52 connected to the engine crank shaft 12.

Figure 3:
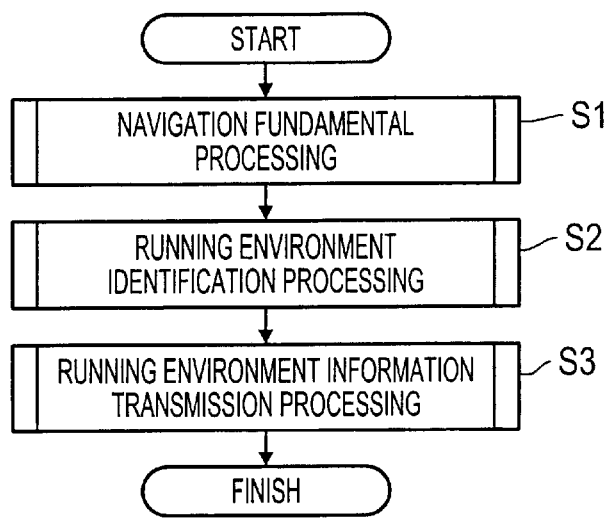
FIG. 3 is a flowchart of processing executed by a navigation device.

Next, the vehicle control apparatus 1 according to the embodiment of the invention will be described with reference to FIG. 1 to FIG. 16. FIG. 3 is a flowchart of a processing executed by the navigation device 3, and FIG. 4 is a flowchart of a processing executed by the transmission control apparatus 4.

Figure 4:
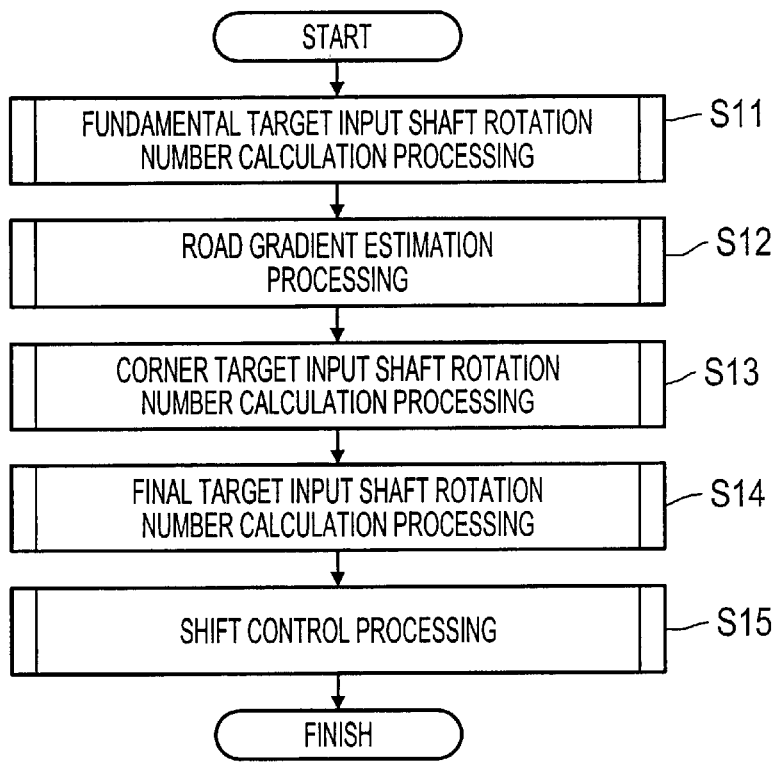
FIG. 4 is a flowchart of processing executed by a transmission control apparatus.

More particularly, FIGS. 3 and 4 show flowcharts of the entire cornering control executed by the vehicle control apparatus 1. The cornering control includes the processing (steps S1 to S3) executed by the navigation device 3, as shown in FIG. 3, which is the first stage of cornering control, and the processing (steps S11 to S15) executed by the transmission control apparatus 4, shown in FIG. 4, which is a following stage of the cornering control. Hereinafter, the processing executed by the navigation device 3 and the transmission control apparatus 4, respectively, will be separately explained.

Processing Executed by the Navigation Apparatus (Step S1 to Step S3)

First, in step S1, the fundamental processing means 31, shown in FIG. 1, detects the predetermined vehicle information, and executes normal fundamental processing, such as providing route guidance based on the vehicle information.

In particular, the fundamental processing means 31 detects the aforementioned road information, i.e., the directional bearing of the vehicle and the vehicle speed detected respectively by the gyro sensor 21 and the vehicle speed sensor 22, shown in FIG. 1, and detects the vehicle information from the signal of the GPS receiver, and the like (for example, the present position and the direction of movement of the vehicle). The fundamental processing means 31 then uses this information to indicate the present position of the vehicle using a plotted map or audio communication, and also provides route guidance concerning how to reach the input destination.

Figure 5:
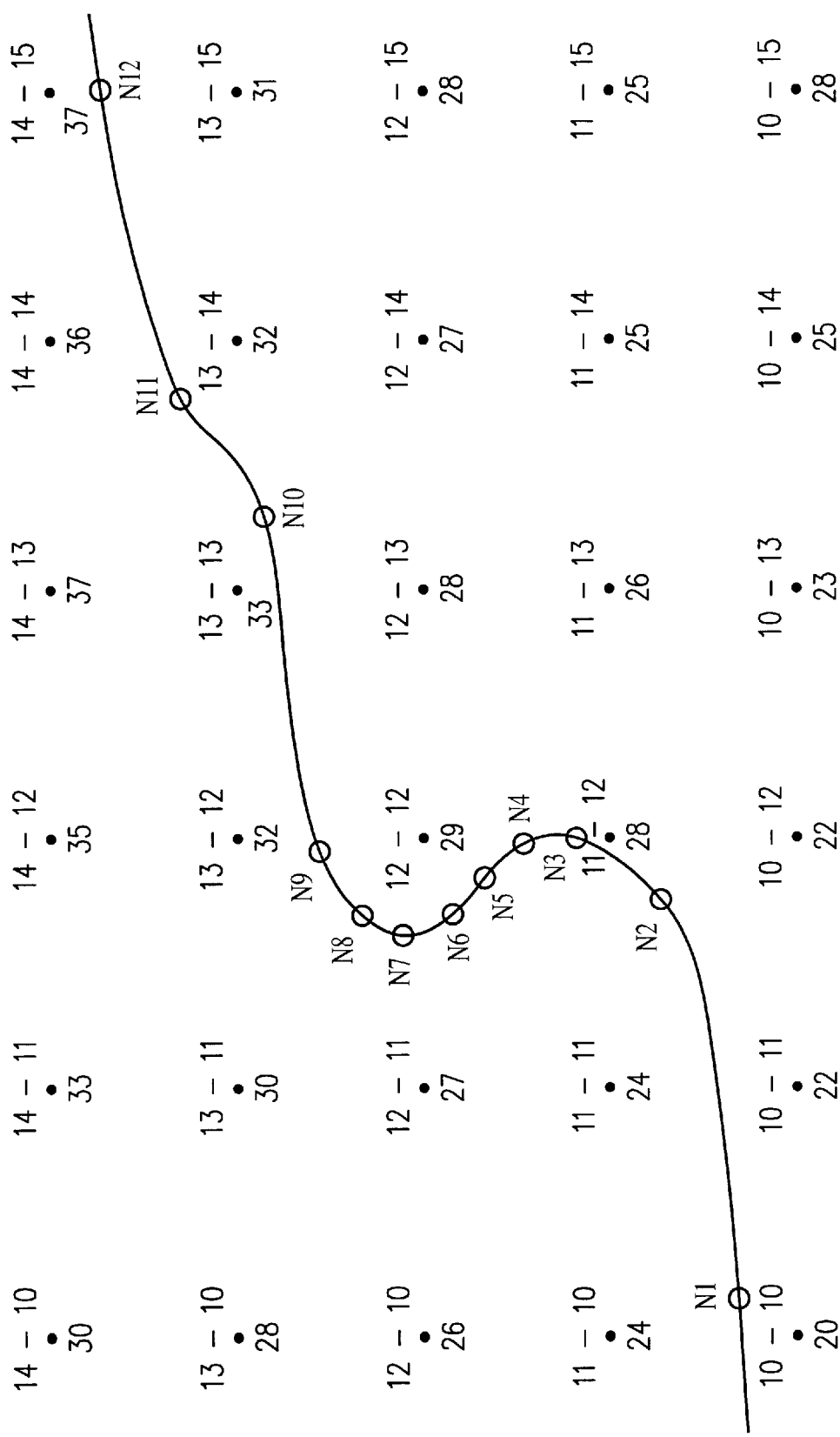
FIG. 5 shows an example of contents of road information.

Next, the road information will be explained with reference to FIG. 5. FIG. 5 shows an example of the contents of the road information. In the aforementioned storage medium, as shown in FIG. 5, the road information is stored as nodes and lines between nodes. The solid line shown in FIG. 5 indicates the shape of the road. In this case, the road is indicated as a spline curve by linking curved line portions which smoothly connect each node N1, N2, N3 ... N12 to the adjacent node. Each node is defined in terms of coordinates, such as longitude and latitude, which are absolute coordinates. The road shape can also be defined in terms which include altitude, as well as the previously described linking of nodes.

In this case, altitude data is stored for each point (each point such as 10—10, 10–11 ... 14–15, indicated in FIG. 5) of a matrix having a predetermined left-right-up-down distance (for example, 50 m). For example, in FIG. 5, data is stored for the points 11—11 and 11–12, showing the respective altitudes to be 24 m and 28 m. Accordingly, the altitude of each node can be calculated by plotting supplementary lines between each of the points.

Furthermore, the aforementioned linking of the nodes is further specified using road characteristics data and road type data, and the like, indicating particular characteristics of the road. For example, the road characteristics data includes such items as the number of lanes, whether the road is a one-way road, whether there are any intersections, how many roads there are at intersections if they exist, road distance, road width, road cant and bank, and the like. The road type data includes information about the road type, such as whether the road is an expressway, a national highway, an ordinary road, or the like.

Furthermore, with regard to the vehicle information, an example of detecting vehicle information based on road information stored in the storage medium has been described above. However, the invention is not limited to this. Accordingly, any information from which the vehicle information can be obtained may be used. For example, it is possible to provide more accurate vehicle information by using the aforementioned road information and supplementing it with vehicle position information detected by sensors buried along the road.

Figure 6:
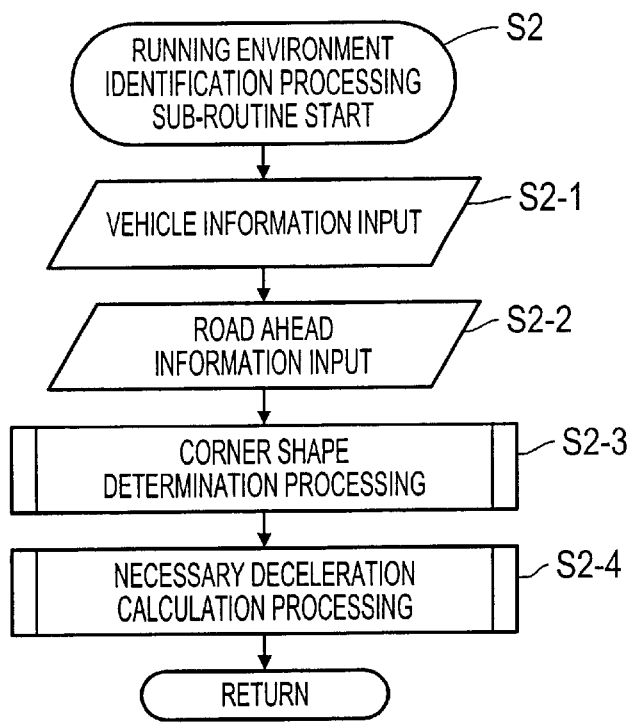
FIG. 6 is a flowchart of a sub-routine of running environment identification device.

In step S2, the running environment identification means 32 executes running environment identification processing. This running environment processing which is executed in the navigation device processing will be explained with reference to FIG. 1 and FIG. 6. FIG. 6 is a flowchart of a sub-routine of the running environment identification means.

As shown in FIGS. 1 and 6, in step S2-1, the fundamental processing means 31 outputs the vehicle information detected during the navigation fundamental processing (S1) to the corner detection means 33. Then, in step S2-2, the road information concerning the road ahead of the vehicle (hereinafter referred to as "road ahead information") detected in the aforementioned processing (S1) is output to the corner detection means 33.

In step S2-3, the corner detection means 33, which has received the vehicle information and the road information, executes a corner shape determination processing based on this information. In the corner shape determination processing, it is determined, for example, whether the corner is gentle, moderately curved or sharp, using a turn angle $\theta$, described later, based on the vehicle information and the road ahead information.

Figure 7:
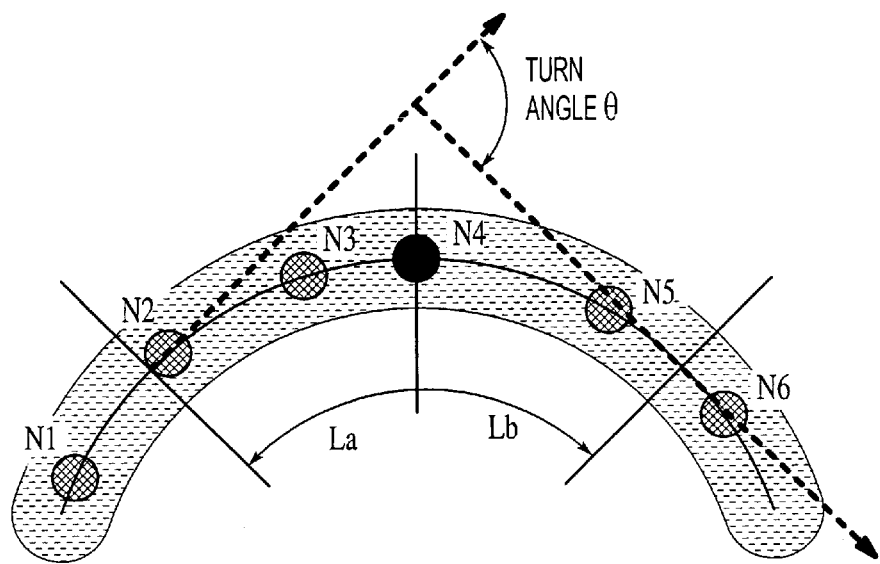
FIG. 7 shows an example of a shape of a corner.

The specific details of the corner shape determination processing will be explained with reference to FIG. 7. FIG. 7 shows an example of a shape of a corner. FIG. 7 shows a road with a corner represented by linking curved line portions which smoothly connect the nodes N1, N2, N3 ... N6. In the case where the road shown in FIG. 7 is the road ahead of the vehicle, the turn angle $\theta$ at the node N4 (the node shown in the center of FIG. 7), for example, is indicated by the angle of intersection of the lines tangential to the curved portions La and Lb whose furthest points are at a predetermined distance from the node N4 in opposite directions (the turn angle $\theta$ of a straight road is (0)). In other words, a larger turn angle $\theta$ indicates a corner with a sharper shape, and contrarily, a smaller turn angle $\theta$ indicates a corner with a more gentle shape.

In addition, predetermined turn angles $\theta$ are set, and determination of the corner shape is executed according to step-like classifications (for example, the corner is determined to be gentle, moderately curved or sharp). More specifically, the predetermined turn angles $\theta 1$, $\theta 2$ and $\theta 3$ are set in advance ($\theta 1 < \theta 2 < \theta 3$). The turn angle $\theta$ of the corner ahead of the vehicle is then determined to be one of the gentle corner ($\theta 1 < \theta \leq \theta 2$), the moderately curved corner ($\theta 2 < \theta \leq \theta 3$), and the sharp corner ($\theta > \theta 3$). Accordingly, the corner detection means 33 executes the corner shape determination processing based on the vehicle information and the road ahead information.

Furthermore, the route that the vehicle is scheduled to run along (hereinafter referred to as the "scheduled running route") is set in the navigation device 3. For example, when the running route to the destination is set in advance in the navigation device 3, this set route is taken to be the schedule running route. However, when no route is set in advance in the navigation device 3, for example, a road that the vehicle is anticipated to take (for example, it may be anticipated that the vehicle will continue traveling on a road having the same type as the road the vehicle is presently running on) can be set as the scheduled running route. As a result, the corner detection means 33 can determine the corner shape at each node along the schedule running route. In addition, the corner shape determination processing is not limited to corners like that shown in FIG. 7. This processing can be similarly used to calculate the corner shape of intersections, T-shaped intersections, and the like.

Moreover, the corner shape determination processing previously described, executes determination according to three classifications, i.e., gentle, moderate and sharp corner classifications. However, the invention is not limited to such. For example, it is possible to set more classifications, for example, four or more classifications, which indicate the corner shape (the predetermined turn angles θ set in advance), and use them for determination, in order to further improve the accuracy of determination for starting corner control.

In addition, although the turn angle θ has been described as an example of indicating corner shape, the invention is not limited to this, and any item indicating the corner shape may be used. For example, the corner shape processing determination may be executed using the curvature of radius of a circle passing through three nodes.

Figure 8:
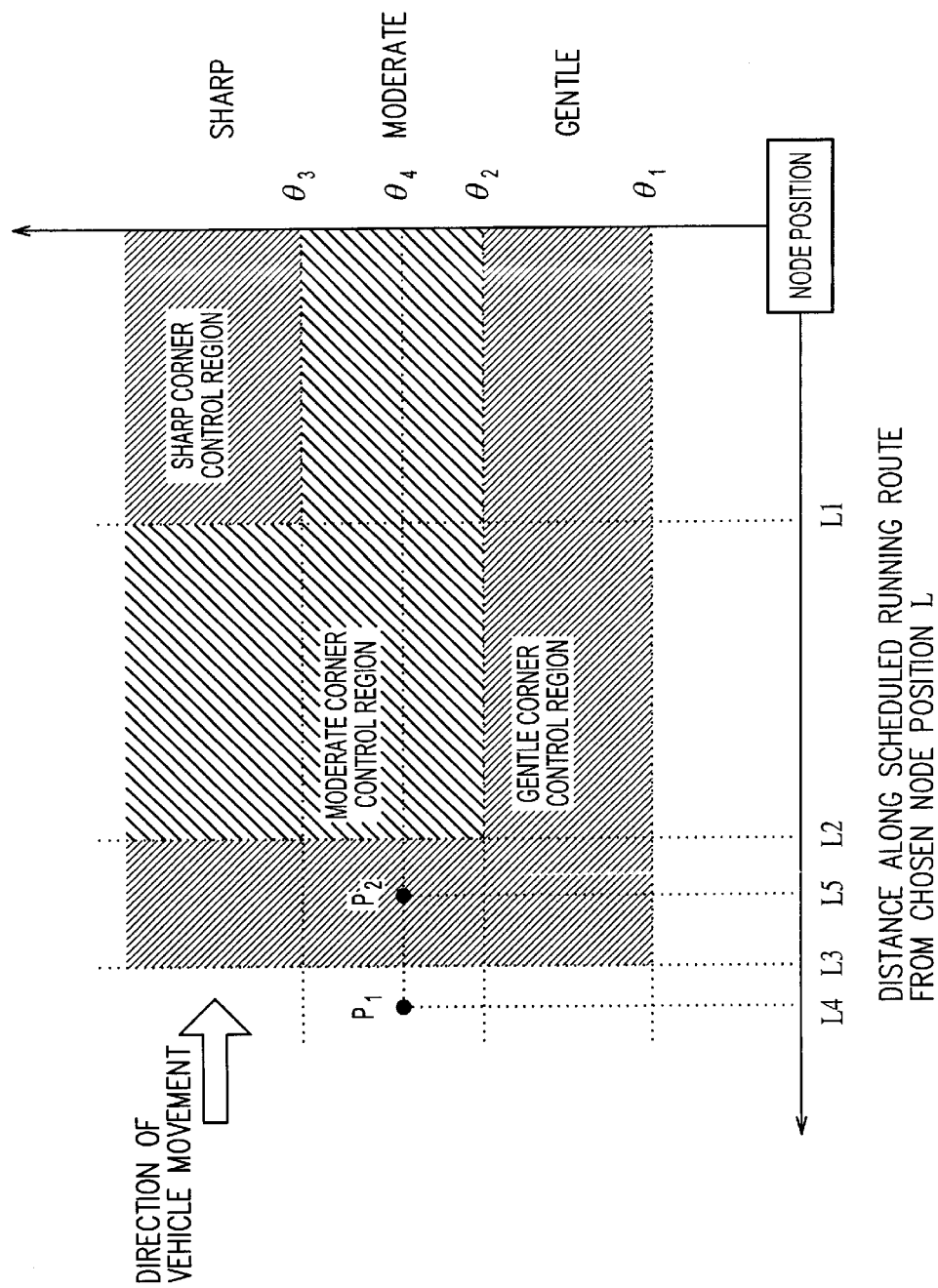
FIG. 8 shows an example of a corner determination map.

Next, the running environment identification means 32 prepares a predetermined corner determination map as shown in FIG. 8, based on the corner shape determination processing. It is then determined whether the corner ahead of the vehicle is a specified corner (a specific corner) which falls within certain regions of the map, described hereinafter. FIG. 8 shows an example of the corner determination map.

The horizontal axis of the map in FIG. 8 shows a distance L from a given node position (the origin of FIG. 8) along the scheduled running route, when a vehicle is running from the left to the right side of FIG. 8. Furthermore, the vertical axis of the map in FIG. 8 indicates the corner shape according to the turn angle θ at each node. The turn angle θ becomes larger, or in other words, the corner shape becomes sharper, along with movement toward the top of the vertical axis from the bottom.

For example, the distance L from the position of the given node at the horizontal axis right hand edge (the origin of FIG. 8) is divided into three distances L1, L2, L3 (L1<L2<L3). Moreover, the turn angle θ is also divided, from the bottom edge of the vertical axis, into the three turn angles θ1, θ2, θ3 (θ1<θ2<θ3) previously set in the corner shape determination processing (S2-3 of FIG. 6). In addition, three corner control regions are respectively set, these being: a sharp corner control region in the upper right section of the map in FIG. 8 (L<L1 and θ>θ3); a moderately curved corner control region in the center section of the same map (the region L<L2 and θ>θ2, excluding the sharp corner control region); and a gentle corner control region in the bottom left section of the same map (the region L<L3 and θ>θ1, excluding the sharp corner and the moderately curved corner control regions).

As a result of this, if the vehicle is running, for example, toward a node having a corner shape with a turn angle θ4 (θ2<θ4<θ3), and the present position of the vehicle is separated from the applicable node position (the origin in FIG. 8) by a distance L4 (L4 >L3), the corner does not fall within any of the corner regions. In other words, the running environment identification means 32 determines that there is no specific corner within a predetermined range (Ld) along the scheduled running route from the present vehicle position. However, as the vehicle approaches the applicable node position and reaches the distance L5 from the applicable node (L2<L5<L3) (the point P2 on the left side of FIG. 8), the approaching corner is determined to be a specific corner since it falls within the gentle corner control region.

In step S2-4 of FIG. 6, the running environment identification means 32 calculates the necessary deceleration Gr for each node. The corner detection means 33 then detects, as the specific corner, the corner of the node ahead of the vehicle within the predetermined range Ld which requires the largest necessary deceleration Gr.

Next, the necessary deceleration calculation processing will be explained. First, when the necessary deceleration Gr for each node is calculated, the vehicle speed V (hereinafter referred to as "recommended vehicle speed Vr") at which the vehicle can stably drive around the corner at each node is calculated based on the turn angle θ obtained during the corner shape determination processing (S2-3). The phrase "can stably drive around the corner" used at this point, indicates that while the vehicle is driving around the corner, the acceleration of the force acting upon the driver in the opposite direction to the center of turning (hereinafter referred to as "lateral acceleration"), namely, the same direction as the centrifugal force, is a predetermined lateral acceleration which does not cause the driver or the occupant to feel a sense of discomfort.

In other words, by setting the predetermined lateral acceleration (e.g., 0.2G, when G is gravitational acceleration) which does not cause discomfort, the recommended vehicle speed Vr can be calculated based on a predetermined formula using the turn angle θ and the predetermined distances La and Lb. Furthermore, the calculation of recommended vehicle speed Vr is not limited to each of the aforementioned nodes. It is also possible to establish hypothetical nodes (hereinafter referred to as "supplementary points") which are a fixed distance apart and divide up the linking curved line portions. By setting these supplementary points, it is possible to make a more detailed determination of the corner shape. As a result, it is possible to set the recommended vehicle speed Vr such that it corresponds more closely to the road configuration. Furthermore, the radius of curvature of a circle passing through any three nodes can be calculated. In this case, the recommended vehicle speed Vr can be calculated based on this radius of curvature and the predetermined lateral acceleration which does not cause discomfort.

Figure 9:
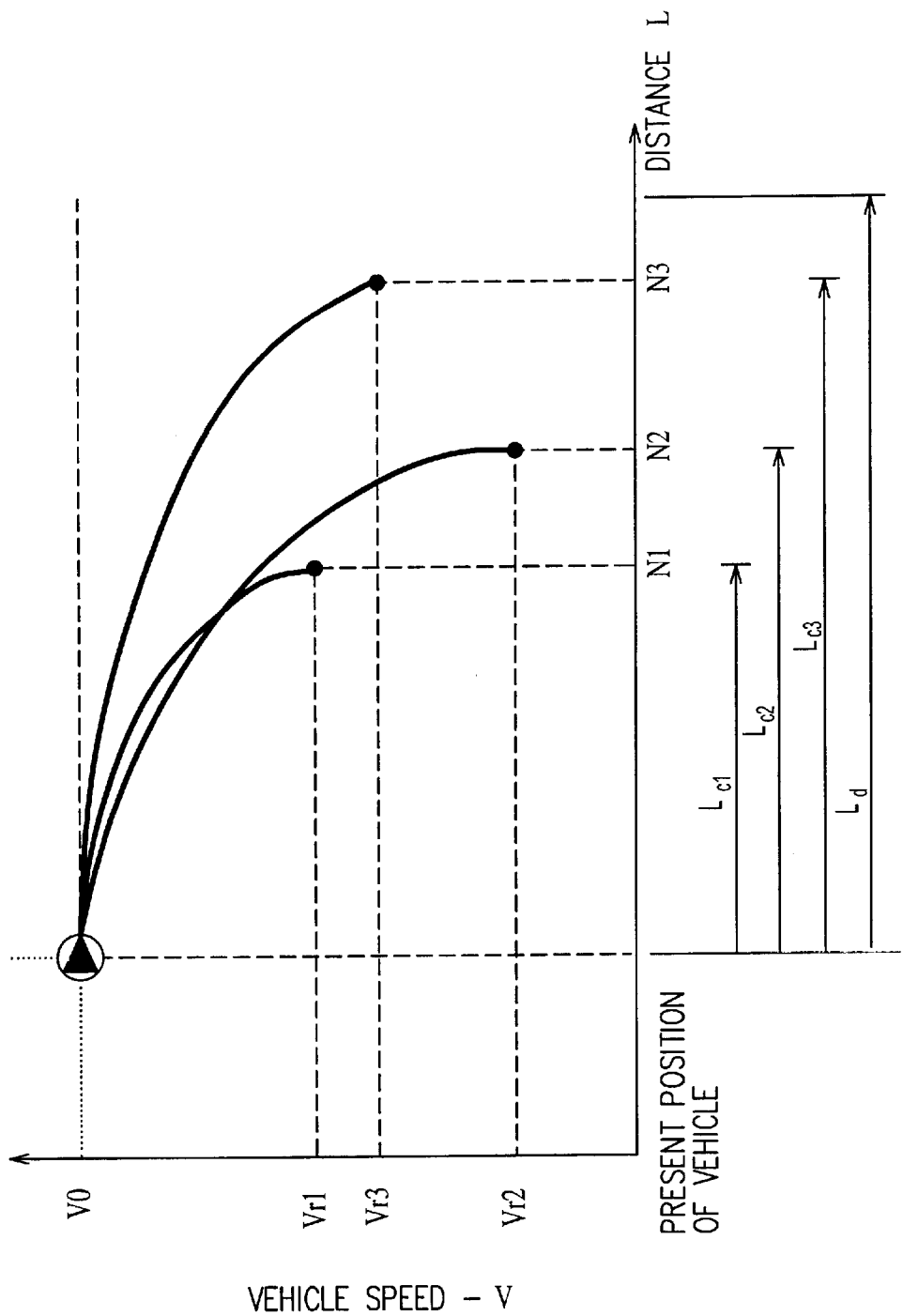
FIG. 9 shows a necessary deceleration for each corner at a node.

Next, the calculation of the necessary deceleration Gr based on the recommend vehicle speed Vr will be explained with reference to FIG. 9. FIG. 9 shows a necessary deceleration for the corner at each node. The phrase "necessary deceleration Gr" used at this point, indicates the necessary reduction of speed when reducing the vehicle speed V to the recommended vehicle speed Vr, in order for the vehicle to stably run around the corner. This reduction of speed is brought about by action of the engine brake prior to driving around the corner.

In particular, for example, the necessary reduction of speed Gri at the corner of a given node Ni, is calculated using formula (1) below, in which the present vehicle speed is V0; the recommended vehicle speed at node Ni is Vri; and the distance from the present position of the vehicle to the node Ni is Lci.

$$Gri=(V0^2-Vri^2)/(2 \times Lci) \qquad (1)$$

For example, as shown in FIG. 9, the recommended vehicle speeds Vr1, Vr2 and Vr3 are calculated based on the turn angle θ, and the like, of the corner of each node N1, N2, N3 within the predetermined range Ld (e.g., within 200 m) along the scheduled running route from the present position of the vehicle. The respective necessary decelerations Gr1, Gr2, Gr3 are calculated for each corner using formula (1) based on the respective distances to each node Lc1, Lc2 and Lc3 from the present position of the vehicle. In other words, if the vehicle speed V at each node is reduced in line with the transition paths shown in FIG. 9, it is possible for the vehicle to stably run around the corner of each node. Furthermore, the aforementioned formula (1) is an example of a formula that may be used to calculate the necessary deceleration Gr. However, the invention is not limited to this, and any formula may be adopted which allows the vehicle to stably run around the corner of each node.

In addition, the running environment identification means 32 selects the maximum value among the necessary decelerations Gr for the nodes within the predetermined range Ld. This maximum value is then set as the final necessary deceleration Gr (hereinafter referred to as "final necessary deceleration Grf"). For example, in FIG. 9, among the aforementioned Vr1, Vr2 and Vr3, the necessary deceleration Gr2 to reach the minimum vehicle speed Vr2 at the node N2 is the maximum value among the three nodes. Accordingly, the necessary deceleration Gr2 at the node N2 is set as the final necessary deceleration Grf.

In the above example, three nodes N1, N2, N3 are described. However, in reality, recommended vehicle speeds Vr1, Vr2 .... Vrn for all of the nodes N1, N2 ... Nn within the predetermined range Ld from the present position of the vehicle can be calculated. Accordingly, the distances Lc1, Lc2 ... Lcn to each node can be obtained and the necessary decelerations Gr1, Gr2 ... Grn calculated for all of the nodes within the predetermined range Ld. Then, the final necessary deceleration Grf, which is the maximum value among the necessary decelerations, is set.

In step S3, the running environment identification means 32 identifies the corner shape determination result for each node along the scheduled route and the final necessary deceleration Grf as the running environment information. Then, as shown in FIG. 1, the running environment identification means 32 outputs (transmits) this running environment information to the road information target input shaft rotation number setting means 45c of the road information shift control means 45, and the destination setting means 43 of the shifting speed control means 41. In addition, when the specific corner is detected, the detection result is output to the continuous control corner detection means 45d of the road information shift control means 45.

Next, the processing executed by the transmission control apparatus 4 in step S11 to step S15 (FIG. 4), which is the latter stage of the cornering control, will be explained. As shown in FIG. 4, during the processing executed by the transmission control apparatus 4, the fundamental target input shaft rotation number calculation means 46a calculates a fundamental target input shaft rotation number $N_B$, described hereinafter, and outputs this calculation result and a deceleration intention of the driver to the final target input shaft rotation number selection means 48 (step S11). The road gradient estimation means 47 estimates the road gradient of the road the vehicle is running along, and outputs this result to the road information target input shaft rotation number setting means 45c (step S12). The road information target input shaft rotation number setting means 45c sets a target input shaft rotation number $N_C$ for the corner (hereinafter referred to as "corner target input shaft rotation number $N_C$", described later, based on the aforementioned estimate result and the running environment information, and outputs this setting result to the final target input shaft rotation number selection means 48 (step S13). Furthermore, the final target input shaft rotation number selection means 48 determines (selects) a final target input shaft rotation number $N_F$, which is to be the final target, described hereinafter, from the fundamental target input shaft rotation number $N_B$ and the corner target input shaft rotation number $N_C$ (step S14). Then, the shift execution device 49 executes shifting of the CVT 5 such that the input shaft rotation number becomes substantially equal to the final target input shaft rotation number $N_F$. Accordingly, the vehicle is able to stably run around the specific corner (step S15).

Addressing the actions in detail, first, in step S111, the fundamental target input shaft rotation number calculation means 46a of the shift control means 46 calculates the input shaft rotation number (hereinafter referred to as "fundamental target input shaft rotation number $N_B$") during execution of the normal control (i.e., a predetermined target input shaft rotation number is calculated based on the vehicle state information).

Figure 10:
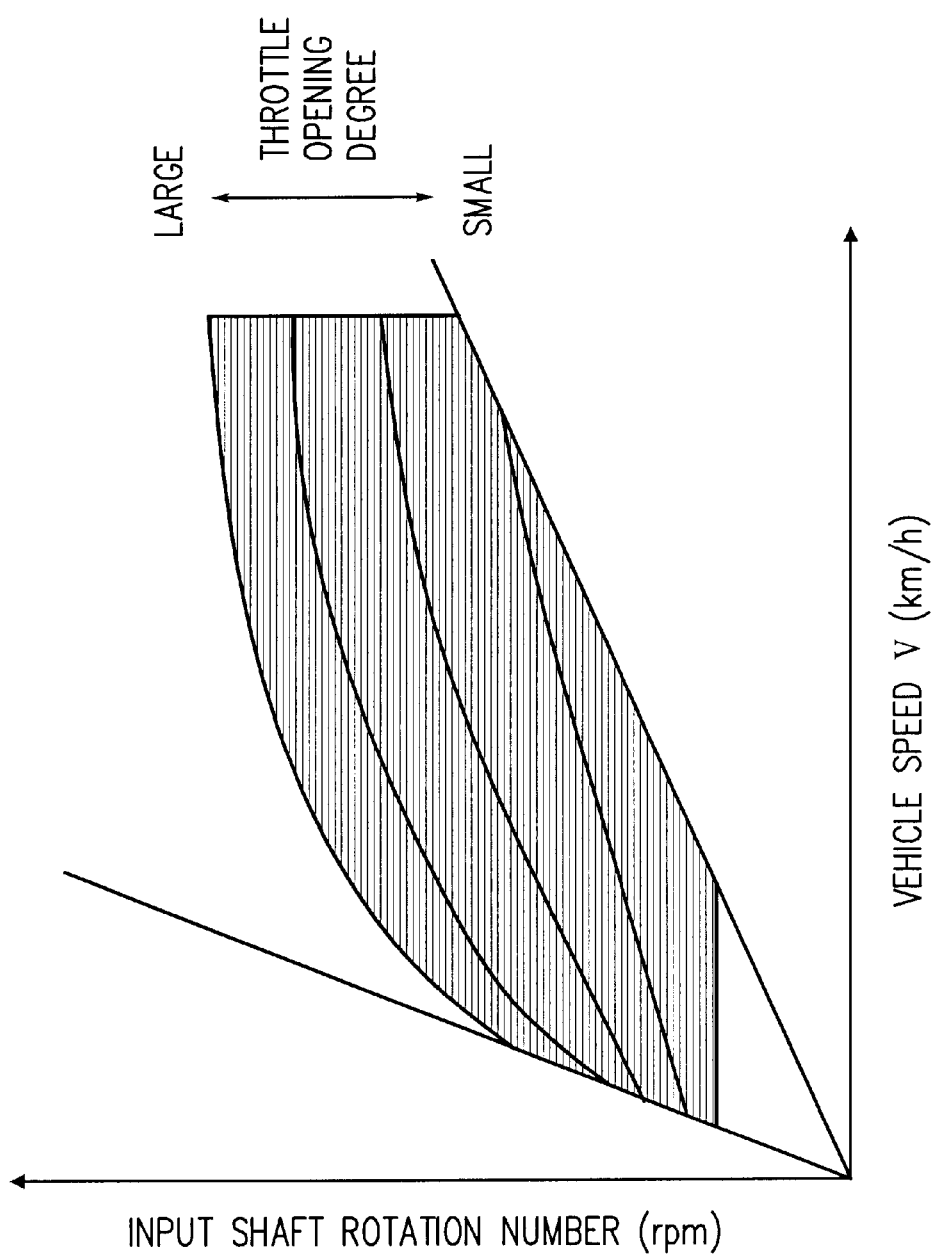
FIG. 10 shows an example of a fundamental target input shaft rotation number map.

The calculation of the fundamental target input shaft rotation number $N_B$ will be explained in more detail with reference to FIG. 1 and FIG. 10. FIG. 10 is a figure showing an example of a fundamental target input shaft rotation number map. The map shown in the figure is based on the vehicle speed V from the vehicle speed sensor 22, the throttle opening degree from the throttle opening degree sensor 25, and a shift position signal from a shift position selection portion, not shown. The map shows the shift ratio (namely, the fundamental target input shaft rotation number $N_B$ with respect to vehicle speed V) for executing shifting of the CVT 5 by the shift execution means 49 such that optimum fuel consumption characteristics or maximal drive characteristics are obtained. Accordingly, the fundamental target input shaft rotation number calculation means 46a shown in FIG. 1 calculates the fundamental target input shaft rotation number $N_B$ based on the map which uses the vehicle speed V and the throttle opening degree received from the vehicle state detection apparatus 2, and the shift position signal received from the shift position selection portion. This calculation result is then output to the final target input shaft rotation number selection means 48.

In step S12, the road gradient estimation means 47 estimates the road gradient, in order to correct the corner target input shaft rotation number $N_C$, described hereinafter. This estimate is based on the throttle opening degree and the vehicle speed V received from the vehicle state detection apparatus 2, and an acceleration of the vehicle received from an acceleration sensor, not shown, and the like. The estimation result is output to the road information target input shaft rotation number setting means 45c (refer to FIG. 1).

Figure 11:
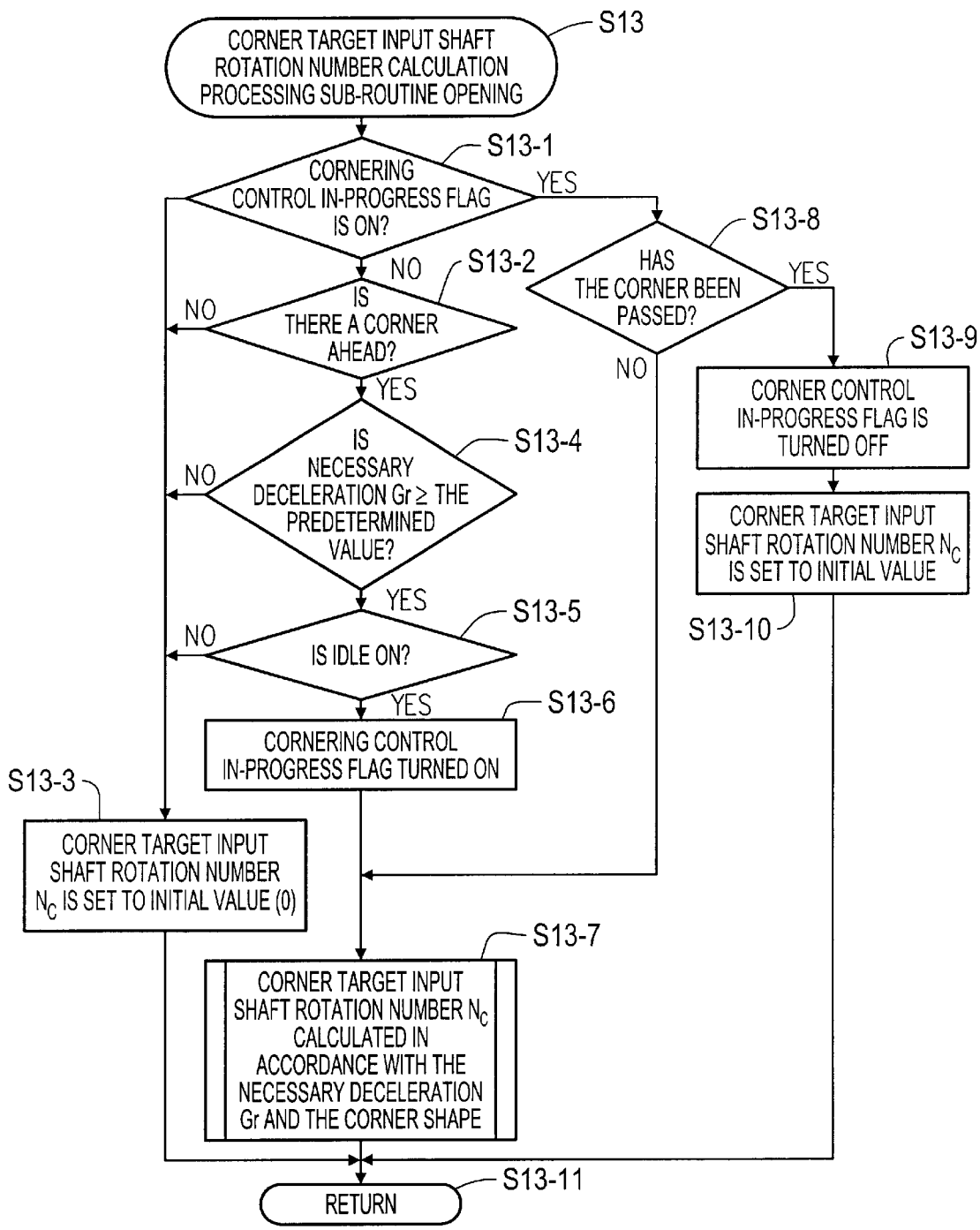
FIG. 11 is a flowchart of a sub-routine for a corner target input shaft rotation number calculation processing.

Next, in step S13, the road information target input shaft rotation number setting means 45c calculates the recommended corner target input shaft rotation number $N_C$, with respect to the shape of the specific corner (i.e., a predetermined target input shaft rotation number is calculated based on the road information). Next, the processing of step S13 will be explained in more detail with reference to FIG. 11. FIG. 11 shows a flowchart of a sub-routine for the corner target input shaft rotation number calculation processing.

First, in step S13-1, the road information shift control means 45 determines whether a cornering control in-progress flag is ON. The flag indicates that cornering control is being executed. Immediately after the start of cornering control, for example, when the engine is started, the cornering control in-progress flag is initialized and thus OFF (NO in step S13-1). Next, it is determined (step S13-2) whether there is a specific corner ahead of the vehicle (within the predetermined range Ld along the scheduled route of the vehicle), based on the determination result of the corner shape determination processing of step S2-3. If it is determined that there is no specific corner (NO in step S13-2), the corner target input shaft rotation number $N_C$ is initialized (for example, to an initial value 0) (step S13-3), and the sub-routine is returned (step S13-11). When the vehicle is running along a straight road (or, a corner which does not require cornering control), the routine repeats and normal control continues, until it is determined that there is a specific corner ahead of the vehicle.

Next, when it is determined that there is a specific corner ahead of the vehicle by the determination of step S13-2 (YES in step S13-2), the routine proceeds to step S13-4. In other words, the road information shift control means 45 determines, based on the running environment identification information received from the running environment information transmission device 34, that there is a specific corner ahead of the vehicle when the vehicle is within the predetermined control range of the map shown in FIG. 8.

In step S13-4, the road information shift control means 45 determines whether the necessary deceleration Gr is equal to or above a predetermined value (step S13-4). If it is determined that the necessary deceleration Gr is less than the predetermined value (NO in step S13-4), for example, when the present vehicle speed $V_0$ is smaller than the recommended vehicle speed Vr (when the predetermined value is equal to or above 0), the sub-routine is returned by proceeding through steps S13-3 and S13-11, in a manner similar to that described above.

On the other hand, if the necessary deceleration Gr is determined to be equal to or more than the predetermined value in step S13-4 (YES in step S13-4), the sub-routine proceeds to step S13-5. Namely, the road information shift control means 45 determines that the necessary deceleration Gr for the specific corner is equal to or above the predetermined value, based on the detection result of the running environment identification device 32.

Next, in step S13-5, the road information shift control means 45 determines whether there is an idle ON state, which is taken to be an indication that the driver intends to decelerate. When there is not an idle ON state (NO in step S13-5), the sub-routine is returned by proceeding through steps S13-3 and S13-11, in a manner similar to that described above.

On the other hand, if it is determined that there is an idle ON state in step S13-5 (YES in step S13-5), the cornering control in-progress flag is turned ON (step S13-6). At the same time, the road information target input shaft rotation number setting device 45c shown in FIG. 1 calculates the corner target input shaft rotation number $N_C$ based on the necessary deceleration for the specific corner (step S13-7), and the sub-routine is returned (step S13-11).

In other words, the road information shift control means 45 detects the intention of the driver with respect to deceleration using a representative state, or the like. For example, the road information shift control means 45 detects that the accelerator pedal 7 is in an OFF state (hereinafter referred to as "accelerator OFF") based on the detection result of the accelerator sensor 23, or detects that the throttle valve 9 has a predetermined opening degree (for example, the normal opening degree during idling) based on the detection result of the throttle opening degree sensor 25. If such states are detected, the control of the road information shift control means 45 starts. Accordingly, it is possible to reliably detect the deceleration intention of the driver, and based on this intention, it is possible to start the control of the road information shift control means (shift control means) 45. As a result, engine brake (i.e., deceleration of the vehicle acceleration change) in accordance with the expectations of the driver can be applied. Thus, it is possible to prevent the driver or the occupant from feeling any sense of discomfort.

Figure 12:
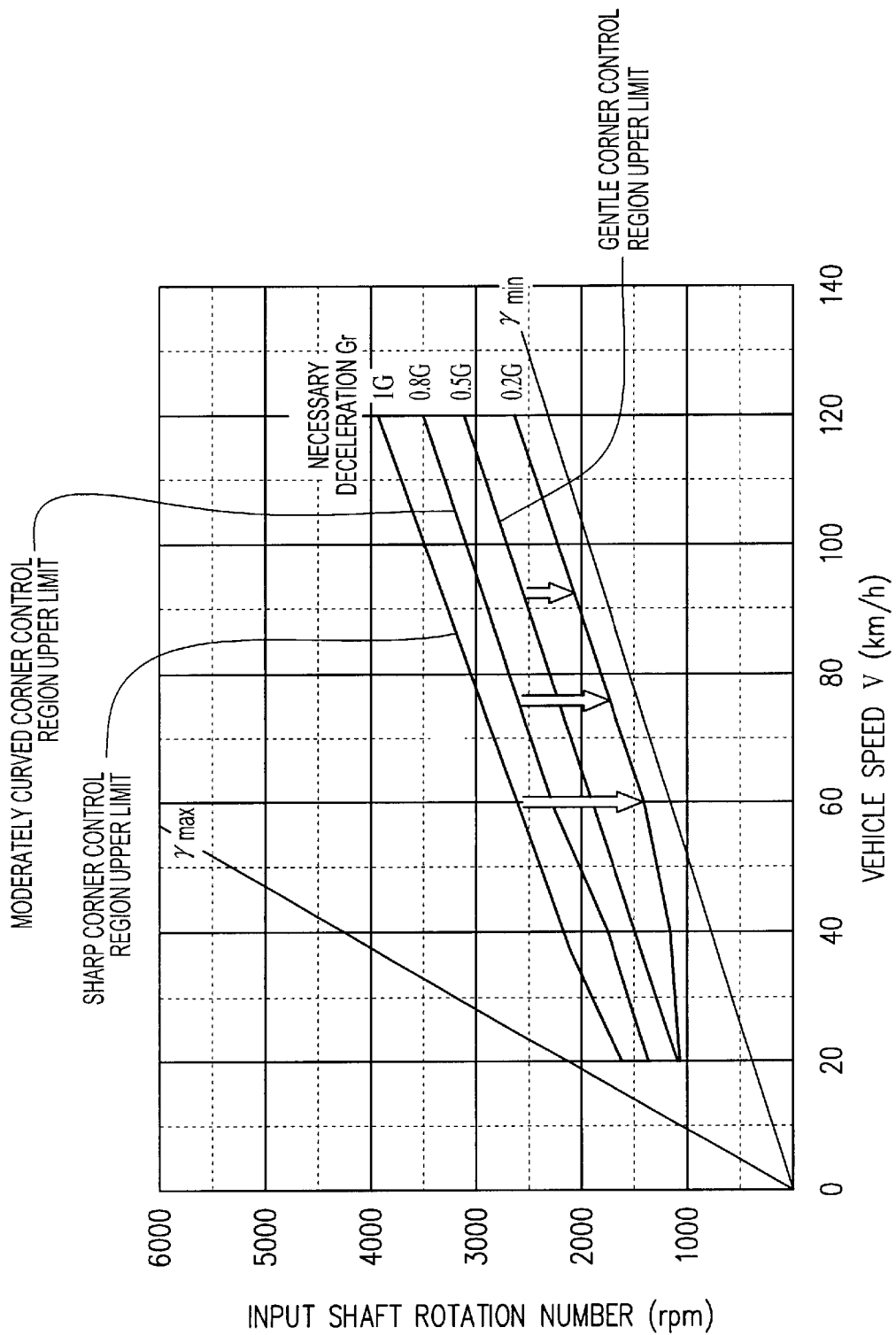
FIG. 12 is a figure showing an example of a corner target input shaft rotation number map.

Next, the calculation of the corner target input shaft rotation number $N_C$ will be explained in detail with reference to FIG. 12. FIG. 12 shows an example of a corner target input shaft rotation number map. In FIG. 12, the vertical axis of the map shows the input shaft rotation number and the horizontal axis shows the vehicle speed V. In addition, the necessary deceleration Gr is included as a parameter. For example, when the necessary deceleration Gr calculated by the necessary deceleration calculation processing (step S2-4) for the specific corner detected ahead of the vehicle is 0.5G, and the present vehicle speed is $V_0$ is 90 km/h, the calculated corner target input shaft rotation number $N_C$ according to FIG. 12 is approximately 2,500 rpm.

However, in a case where the corner shape is gentle and the present vehicle speed $V_0$ is high, or in a case where the start of cornering control is delayed due to the accelerator OFF being late (i.e., when Lc is short), the driver or occupant is subjected to a large necessary deceleration Gr based on the aforementioned formula (1). This may cause the driver or the occupant to feel a sense of discomfort. Accordingly, in order to prevent this sense of discomfort from being caused, a predetermined upper limit shown in FIG. 12 for the necessary deceleration Gr is set, based on, for example, the cornering control regions (refer to FIG. 8).

In other words, for example, as shown in FIG. 12, upper limits are set for the necessary deceleration Gr at 1G when the present position of the vehicle is in the sharp corner control region (the upper right section of FIG. 8); 0.8G when the vehicle is in the moderately curved corner control region (substantially the center section of FIG. 8), and at 0.5G when the vehicle is in the gentle corner control region (the bottom left section of FIG. 8).

As a result, as the vehicle approaches the specific corner, for example, as the vehicle enters into the moderately curved corner control region from the gentle corner control region shown in FIG. 8, the upper limit of the necessary deceleration Gr changes from 0.5G to 0.8G. At this time, if the input shaft rotation number during the moderately curved corner control region does not exceed the upper limit (0.8G), then this input shaft rotation number is calculated (set) to be the corner target input shaft rotation number $N_C$. However, in the case that the input shaft rotation number does exceed the upper limit, the input shaft rotation number of the upper limit (the input shaft rotation number indicated by the solid line shown in FIG. 12) is calculated (set) to be the corner target input shaft rotation number $N_C$.

Furthermore, in order to calculate the corner target input shaft rotation number $N_C$ so that it corresponds more closely with the road information, the corner target input shaft rotation number map shown in FIG. 12 may be corrected based on the road gradient estimated during the road gradient estimation processing of aforementioned step S12. For example, if the vehicle is running along a certain downward sloping road, the value of the corner target input shaft rotation number $N_C$ may be calculated by adding a constant value (for example, 500 rpm) to the corner target input shaft rotation number $N_C$ calculated using the map of FIG. 12. Furthermore, by adding a predetermined value which accords with the respective gradient of the downward sloping road to the corner target input shaft rotation number $N_C$ calculated using the map, it is possible to calculate the corner target input shaft rotation number $N_C$ such that it corresponds even more closely with the running environment information.

Moreover, for example, when the vehicle weight increases due to changes in the number of occupants, the weight of baggage, and the like, it is necessary for the corner target input shaft rotation number $N_C$ to be larger even if the vehicle speed V is the same, due to the effect of increased inertia force. Accordingly, in order to calculate the target input shaft rotation number $N_C$ so that it corresponds more closely with the road information, the number of occupants, the weight of baggage, and the like, may be set in advance. Moreover, the vehicle weight may be estimated based on acceleration when a particular output shaft torque is generated. The aforementioned map may then be corrected using the vehicle weight.

Next, if it is determined that the cornering control in-progress flag is ON in step S13-1 (YES in step S13-1), the road information shift control means 45 determines whether the specific corner has been passed (step S13-8). If it is determined that the specific corner has not been passed (NO in step S13-8), the corner target input shaft rotation number $N_C$ calculation is continued (the control of step S13-7 and step 13-11) by the road information target input shaft rotation number setting means 45c while running around the specific corner.

In addition, if it is determined that the specific corner has been passed in step S13-8 (YES in step S13-8), the cornering control in-progress flag is turned OFF (step S13-13), the corner target input shaft rotation number $N_C$ is initialized (for example, to an initial value 0), and the sub-routine is returned (step S13-11).

In step S14 (refer to FIG. 4) the final target input shaft rotation number selection means 48 selects the final target input shaft rotation number (hereinafter referred to as the "final target input shaft rotation number NF"). At this time, the final target input shaft rotation number selection means 48 compares the fundamental target input shaft rotation number $N_B$ for normal control and the corner target input shaft rotation number $N_C$ for cornering control, and selects the higher input shaft rotation number as the final target input shaft rotation number $N_F$ when executing shifting of the CVT 5 by the shift execution device 49 (an input shaft rotation number further to the downshift side), in order to stably run around the specific corner. In other words, the control of the shift control device 45, 46 based on the fundamental target input shaft rotation number $N_B$ (the predetermined target input shaft rotation number calculated using the vehicle state information) and the corner target input shaft rotation number $N_C$ (the predetermined target input shaft rotation number calculated using the road information), is switched between. For example, control using vehicle state information which is normal control, and, for example, control using road information which is cornering control.

In addition, following the start of calculation of the corner target input shaft rotation number $N_C$ by the road information target input shaft rotation number setting device 45c based on the deceleration intention (idle ON), when the corner target input shaft rotation number $N_C$ does not become larger than the actual input shaft rotation number $N_{IN}$ (from the initial value 0), the fundamental target input shaft rotation number $N_B$ is selected as the final target input shaft rotation number $N_F$ in step S14. Accordingly, the final target input shaft rotation number $N_F$ becomes substantially equal to the actual input shaft rotation number $N_{IN}$ and is maintained.

As a result, it is possible to prevent the occurrence of control in which the input shaft rotation number becomes smaller once and then afterwards becomes bigger. Thus, it is possible to prevent the driver or occupant from feeling a sense of discomfort.

Figure 13:
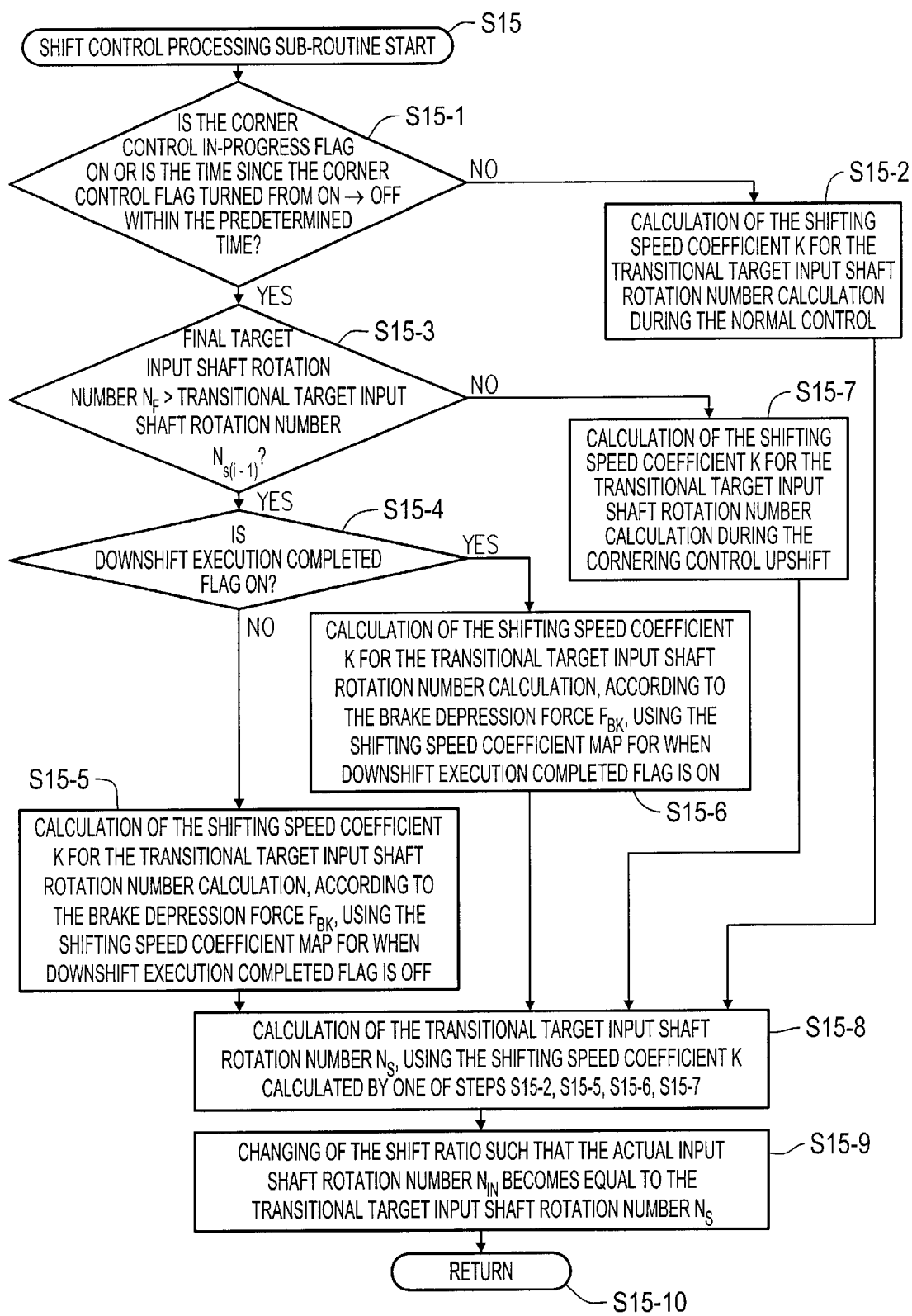
FIG. 13 is a flowchart of a sub-routine of a shift control processing.

Next, the shift execution means 49 executes processing (shift control processing) for controlling the input shaft rotation number such that it becomes equal to the final target input shaft rotation number $N_F$ (the predetermined target input shaft rotation number) by executing shifting of the CVT 5. The processing of step S15 will be explained in detail below with reference to FIG. 13. FIG. 13 shows a flowchart of a sub-routine of the shift control processing.

First, normal control executed when the vehicle is running along a straight stretch of road, or the like (for example, a straight road or a corner which does not require cornering control) will be explained. In step S15-1, the road information shift control means 45 determines whether the cornering control in-progress flag is ON (refer to steps S13-6 and S13-9). When the cornering control in-progress flag is OFF (NO in step S15-1), the shifting speed setting means 44 of the shifting speed control means 41 calculates a shifting speed coefficient K for a transitional target input shaft rotation number $N_S$ (step S15-2), and outputs this calculation result to the transitional target input shaft rotation number calculation device 49a.

The transitional target input shaft rotation number $N_S$ referred to at this point, indicates a target input shaft rotation number by which transitional change to the final target input shaft rotation number $N_F$ from the actual input shaft rotation number $N_{IN}$ occurs at the time when execution of the shifting of the CVT 5 starts. Furthermore, the shifting speed coefficient K is a coefficient for determining, during processing (steps S11 to S15) of the transmission control apparatus 4 repeated at each predetermined cycle (e.g., 16 ms), a change amount of the transitional target input shaft rotation number $N_S$ calculated for each predetermined cycle.

Furthermore, the shifting speed coefficient K during the normal control is calculated based on the vehicle state, such as the accelerator opening degree or the vehicle speed V, and does not take into consideration the specific corner ahead of the vehicle. For example, the shifting speed coefficient K is calculated to be larger, the larger the accelerator opening degree or the smaller the vehicle speed V. In other words, a shifting speed v for normal control is set such that, for example, the shifting speed becomes a larger value so that shifting is rapid when the driver needs to accelerate from a low vehicle speed V, and such that this larger value for rapid shifting is within a range that does not cause a sense of discomfort for the driver.

Next, in step S15-8, the transitional target input shaft rotation number calculation means 49a uses the shifting speed coefficient K to calculate the transitional target input shaft rotation number $N_S$ (step S15-8).

For example the formula (2) below shows an example of calculation of the transitional target input shaft rotation number $N_S$.

$$N_S = N_S(i-1) + K \times (N_F - N_S(i-1)) + C \qquad (2)$$

$N_S(i-1)$ indicates the transitional target input shaft rotation number $N_S$ for the prior cycle (i.e., the actual input shaft rotation number $N_{IN}$). The transitional target input shaft rotation number $N_S$ of formula (2) is an input shaft rotation number calculated by multiplying the difference between the final target input shaft rotation number $N_F$ and the excess target input shaft rotation number $N_S(i-1)$ by the shifting speed coefficient K (the second term), and adding a constant C (the third term) to the prior cycle transitional input shaft rotation number $N_S(i-1)$ (the first term).

As the difference of the second term becomes larger (for example, as the shape of the corner becomes sharper), the change amount (shifting speed v) of the transitional target input shaft rotation number $N_S$ becomes larger. Furthermore, as the aforementioned difference become smaller, namely, as the transitional target input shaft rotation number $N_S$ approaches closer to the final target input shaft rotation number $N_F$, the change amount (shifting speed v) of the transitional target input shaft rotation number $N_S$ becomes smaller. Accordingly, when the shift execution device 49 starts execution of shifting of the CVT 5, the actual input shaft rotation number $N_{IN}$ increases rapidly in a smooth manner such that it reaches substantially the final target input shaft rotation number $N_F$.

Furthermore, the constant C of formula (2) is a minimum input shaft rotation number for preventing the shifting speed v from becoming extremely small when the difference between the excess target input shaft rotation number $N_S(i-1)$ and the final target input shaft rotation number $N_F$ is small, for example, in the case of a corner shape which is gentle (the turn angle θ is small), but which still requires cornering control. The constant C is set to a negative value when the shift ratio is controlled to be small (high speed side) (hereinafter referred to as "upshift control"), and is set to a positive value when the shift ratio is controlled to be high (low speed side) (hereinafter referred to as "downshift control"). In addition, in order to correspond more closely with the road information and the vehicle state information, the constant C may be set based on the road shape, such as corners or curves, the road gradient, such as upward or downward gradient, the road condition, such as the surface smoothness or fallen snow, the vehicle speed, the intentions of the driver, and the like.

Furthermore, as shown in formula (3) below, instead of calculating the shifting speed coefficient K, a sweep amount S for the transitional target input shaft rotation number $N_S$ may be set.

$$N_S = N_S(i-1) + S \quad (3)$$

The sweep amount S is a positive value in the case of downshift control, and is a negative value in the case of upshift control. Namely, the magnitude of these absolute values is set such that the actual input shaft rotation number $N_{IN}$ smoothly reaches substantially the final target input shaft rotation number $N_F$.

Furthermore, formula (2) and formula (3) are examples of predetermined formulas for calculating the transitional target input shaft rotation number $N_S$. However, the invention is not limited to these formulas. Any method for calculating the transitional target input shaft rotation number $N_S$ such that the actual input shaft rotation number $N_{IN}$ smoothly reaches substantially the final target input shaft rotation number $N_F$ may be adopted. For example, a predetermined map may be used for calculation.

In the above manner, the transitional target input shaft rotation number calculation means 49a calculates the transitional target input shaft rotation number $N_S$ based on the shifting speed coefficient K during normal control (step S15-8). The shift execution means 49 then executes control of the shifting of the CVT 5 such that the actual input shaft rotation number $N_{IN}$ becomes equal to the transitional target input shaft rotation number $N_S$ (step S15 7-9). The subroutine is then returned (step S15-10). Accordingly, as long as the corner detection means 33 does not detect a specific corner ahead of the vehicle, or the idle ON state does not occur, (namely, as long as the cornering control in-progress flag is OFF), the processing described above is executed and the normal control continues.

At this time, a predetermined signal is output to the hydraulic actuators 74 and 76 of the CVT 5 shown in FIG. 2, and the hydraulic actuators 74, 76 are controlled using hydraulic pressure supplied in accordance with the shifting speed coefficient K. As a result, the radius of the belt looped around both pulleys 71, 72 is changed. Accordingly, the shift ratio (the actual input shaft rotation number $N_{IN}$ when the vehicle speed V is a constant) is controlled. In other words, the radius of the belt 73 looped around the primary pulley 71 is set to $r_p$, and the radius of the belt 73 looped around the secondary pulley 72 is set to $r_s$, and the shift ratio is controlled by the ratio $r_s/r_p$ of the two radiuses (the pulley ratio).

Next, an explanation will be given of the control executed when moving/running from a straight road or a corner which does not require cornering control to a specific corner requiring cornering control (the first specific corner). When it is determined that the cornering control in-progress flag is ON (YES in step S15-1), the road information shift control means 45 determines whether the final target input shaft rotation number $N_F$ is greater than the prior cycle transitional target input shaft rotation number $N_S$ (i.e., the actual input shaft rotation number $N_{IN}$) (step S15-3). In addition, when the final target input shaft rotation number $N_F$ is greater than the prior cycle transitional target input shaft rotation number $N_S$ (YES in step S15-3), it is determined whether a downshift execution completed flag (described hereinafter) is ON (step S15-4). This downshift execution completed flag indicates that execution of control (downshift control by the cornering control) by the road information shift control means 45 with respect to the specific corner has been completed.

When it is determined that the downshift execution completed flag is OFF (NO in step S15-4), the shifting speed setting means 44, shown in FIG. 1, sets the shifting speed v of the CVT 5 by calculating the shifting speed coefficient K (step S15-5). At this time, the corner which the vehicle is running around is not a specific corner (specified corner) which requires continuation of the control of the road information shift control means 45. Accordingly, the shifting speed setting means 44 calculates a shifting speed coefficient K which is comparatively large and sets the shifting speed v such that it is comparatively large.

Furthermore, when the foot brake 8 is operated, the brake depression force detection means 42a (the deceleration intention detection means 42) shown in FIG. 1 detects the foot brake depression force (hereinafter referred to as "brake depression force $F_{BK}$") from the brake sensor 24, as an indication of the strength of the deceleration intention of the driver. The brake depression force detection means 42a then outputs the detection result to the shifting speed setting means 44, shown in FIG. 1. The shifting speed setting means 44 receives the detection result and then calculates the shifting speed coefficient K in accordance with the brake depression force $F_{BK}$ based on the aforementioned detection result, using the predetermined formula or a predetermined map (described hereinafter), such that the shifting speed coefficient K (the shifting speed v) becomes larger in accordance with increase of the brake depression force $F_{BK}$. Furthermore, the shifting speed setting means 44 outputs the calculated result to the transitional target input shaft rotation number calculation means 49a.

In step S15-8, the transitional target input shaft rotation number calculation means 49a uses the shifting speed coefficient K to calculate the transitional target input shaft rotation number $N_S$ based on, for example, the predetermined formula (for example, the aforementioned formula (2) or formula (3)). Next, the shift execution means 49 changes the actual input shaft rotation number $N_{IN}$ such that it becomes equal to the transitional target input shaft rotation number $N_S$ (step S15-9) and executes shifting repeatedly for each predetermined cycle (step S15-10). Then, the shift execution means 49 changes the input shaft rotation number $N_{IN}$ when the execution of shifting by the shift execution means 49 is started, such that the input shaft rotation number reaches substantially the final target shaft rotation number $N_F$ (NO in step S15-3). In other words, when the control by the road information shift control means (shift control means) 45 starts, the shifting speed v is set comparatively large and downshift control is continued such that shifting is rapidly executed.

Next, cornering control when shifting needs to be executed during control by the road information shift control means 45, namely, for example, cornering control when the vehicle is running around a specific corner (a second specified corner) requiring control of the road information shift control means 45 to be continued while shifting, will be explained. When it is determined that the downshift execution completed flag is ON (YES in step S15-4), the subroutine proceeds to step S15-6. The downshift execution completed flag is turned ON when the continuous control corner detection means (continuous control detection means) 45d, shown in FIG. 1, detects that shifting needs to be executed while continuing control by the road information shift control means 45 during control (cornering control) with respect to the specific corner.

Next, the aforementioned detection of the continuous control corner detection means 45d will be explained in further detail. First, the downshift control detection means 45b of the cornering control detection means (control detection means) 45a shown in FIG. 1, detects, using formula (4) below, when the absolute value of the difference between the prior cycle transitional target input shaft rotation number $N_S$ (i−1) (hereinafter referred to as simply "$N_S$") and the final target input shaft rotation number $N_F$ (the corner target input shaft rotation number $N_C$) is less than or equal to a predetermined value $\alpha$. In other words, the downshift control detection means 45b detects the execution of downshift control in which the actual input shaft rotation number $N_{IN}$ reaches substantially the final target input shaft rotation number $N_F$. Then the downshift control detection means 45b outputs the detection result to the continuous control corner detection means 45d.

$$|N_F - N_S(i-1)| < \alpha \quad (4)$$

where $\alpha$ is a predetermined value.

Next, the continuous control corner detection means 45d turns the downshift execution completed flag ON when, based on formula (5) below, the absolute value of the difference between the final target input shaft rotation number $N_F$ and the fundamental target input shaft rotation number $N_B$ is equal to or above a predetermined value $\beta$. The road information shift control means 45 receives this, and then outputs the determination result to the shifting speed setting means 44.

$$|N_F - N_B| > \beta \quad (5)$$

where, $\beta$ is a predetermined value.

After the vehicle has entered the specific corner and until the specific corner has been passed, the control by the road information shift control means 45 continues. In other words, the transitional target input shaft rotation number $N_S$ is maintained such that it becomes equal to the final target input shaft rotation number $N_F$ (NO in step S13-8, steps S13-7, S13-11, S14 and S15). Accordingly, the above formula (4) is satisfied. In addition, if a second specific corner is detected based on the result of the corner detection means 33 before passing by the specific corner, namely, if the continuous control corner detection means 45d detects the need for shifting (deceleration) to be executed during continuing control (during downshift control) by the road information shift control means 45 with respect to the specific corner, or in other words, if the continuous control corner detection means 45d detects a second specific corner (specified corner) for which control by the shift control device is necessary while control is continued by the road information shift control means 45, it is determined that the specific corner has not been passed (NO in step S13-8). Then, formula (5) above is satisfied by calculating the corner target input shaft rotation number $N_C$ with respect to the specific corner for which shifting (deceleration) needs to be executed while continuing control by the road information shift control means 45 (step 13-7), and the downshift execution completed flag is turned ON.

As a result of the above, it is possible to detect the need to execute shifting during continuing control of the road information shift control means 45. It is possible for the control by the road information shift control means 45 to reliably respond to differences in the expectations of the driver which occur depending on whether the control is starting, or control is underway. Accordingly, it is possible to reliably prevent the driver or occupant from feeling a sense of discomfort.

It should be noted that, in order to make this explanation simpler, the specific corner detected by the corner detection means 33 will be referred to as the "first specific corner", and the specific corner detected by the continuous control corner detection means 45d after the first specific corner will be referred to as the "second specific corner".

On the one hand, if the distance between the first specific corner and the second specific corner is longer than the predetermined range Ld, it is determined that the first specific corner has been passed (YES in step S13-8) even if the second specific corner is detected once the first specific corner has been passed. Thus, the corner target input shaft rotation number $N_C$ is initialized (step S13-10). As a result, the fundamental target input shaft rotation number $N_B$ is selected as the final target input shaft rotation number $N_F$ (step S14), formula (5) above is not satisfied and the downshift execution completed flag is turned OFF.

Furthermore, the predetermined values $\alpha$ and $\beta$ in the above formulas (4) and (5) may be set such that the applied engine brake is in even closer in accordance to the expectations of the driver. This setting may be based on, for example, the road shape, such as corners or curves, the road gradient, such as the upward or downward gradient, the road condition, such as the surface smoothness or fallen snow, and the state of the vehicle running along the road, such as the vehicle speed and/or, the intentions of the driver.

In addition, when it is determined that the downshift execution completed flag is ON due to the determination of step S15-4 (YES in step S15-4), the shifting speed setting means 44 calculates a shifting speed coefficient K which is comparatively small based on the detection result received from the road information shift control means 45 (step S15-6).

Furthermore, as in step S15-5, when the brake depression force detection means 42a detects the brake depression force $F_{BK}$, the shifting speed setting means 44 calculates the shifting speed coefficient K according to the brake depression force $F_{BK}$, such that the shifting speed coefficient K (the shifting speed v) becomes larger as the brake depression force $F_{BK}$ increases.

Figure 14:
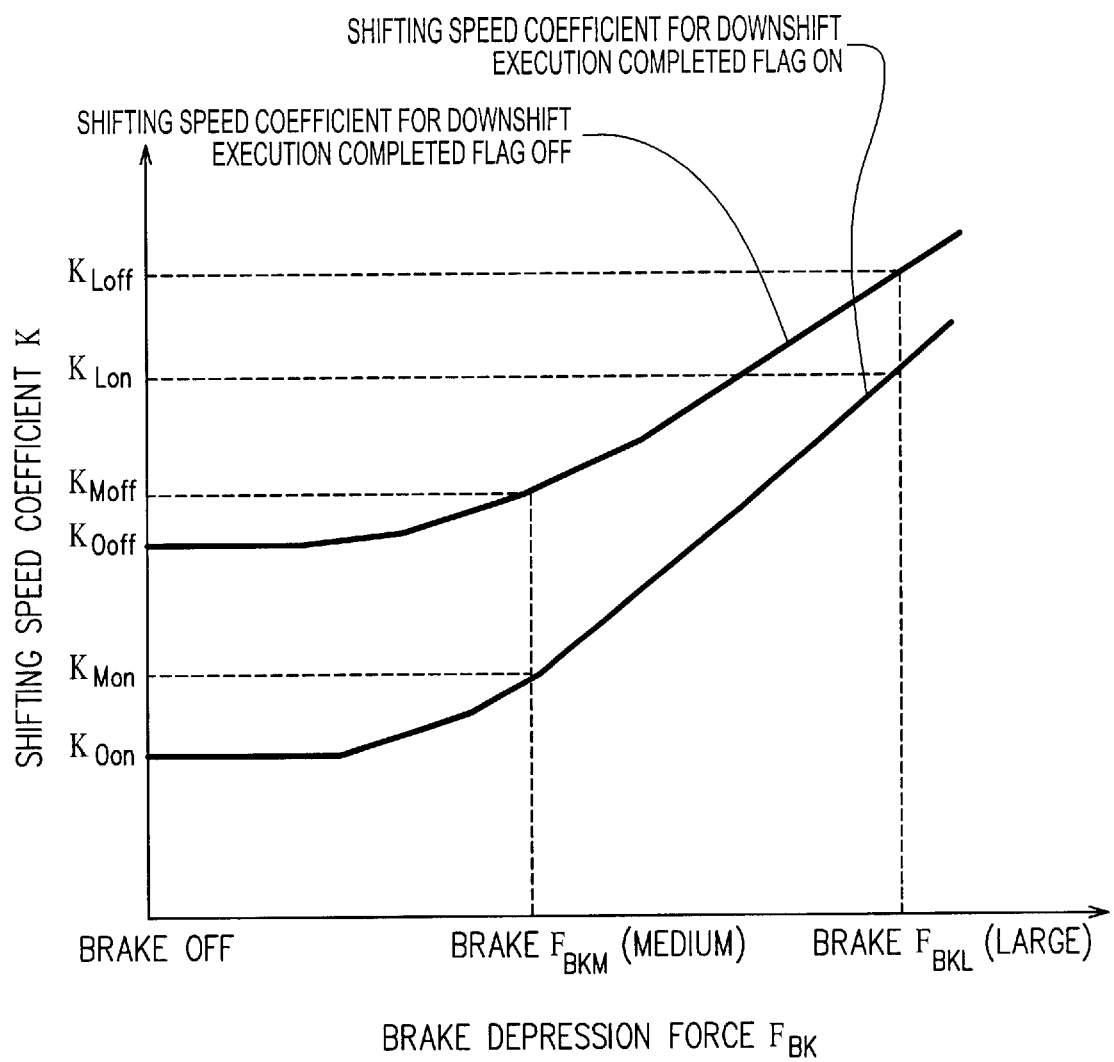
FIG. 14 shows an example of a setting map for a shifting speed coefficient.

For example, the shifting speed setting means 44 may calculate the shifting speed coefficient K according to the predetermined map. FIG. 14 shows an example of the setting map for the shifting speed coefficient K. The upper section of the figure shows the shifting speed coefficient when the downshift execution completed flag is OFF, and the lower section of the map shows the shifting speed coefficient when the downshift execution completed flag is ON. For example, when the downshift execution completed flag is OFF, the shifting speed coefficient K has a tendency to increase in the order $K_{O_{off}}$, $K_{M_{off}}$, $K_{L_{off}}$, with respect to brake depression force $F_{BK}$ 0 (brake OFF), $F_{BKM}$, $F_{BKL}$ ($0<F_{BKM}<F_{BKL}$).

On the other hand, when the downshift execution completed flag is ON, the shifting speed coefficient K has a tendency, similar to that above, to increase in the order, $K_{O_{on}}$, $K_{M_{on}}$, $K_{L_{on}}$, with respect to the brake depression force $F_{BK}$ 0 (accelerator OFF), $F_{BKM}$, $F_{BKL}$. However, even if the brake depression force is the same, when the downshift execution completed flag is ON, the shifting speed coefficient K is set to be smaller than when the flag is OFF ($K_{O_{on}}<K_{O_{off}}$, $K_{M_{on}}<K_{M_{off}}$, $K_{L_{on}}<K_{L_{off}}$).

Furthermore, the map of FIG. 14 is an example of the calculation of the shifting speed coefficient K. However, the invention is not limited to this, and for example, a map using a predetermined formula may be employed. Furthermore, the shifting speed coefficient K shown in the map has a tendency to rise upwards from the bottom of the figure, with respect to the brake depression force $F_{BK}$. However, the invention is not limited to this, and the aforementioned coefficient may be corrected by assigning predetermined weights to the brake depression force $F_{BK}$ (for example, changes such as $F_{BK}$ order, coefficient, constant terms).

In addition, in step S15-8, the transitional target input shaft rotation number calculation device 49a calculates as above, for example, the transitional target input shaft rotation number $N_S$ from the predetermined formula. The shift execution device 49 then changes the actual input shaft rotation number $N_{IN}$ such that it becomes equal to the transitional target input shaft rotation number $N_S$ (step S15-9), repeats execution of shifting for each predetermined cycle (step S15-10) and changes the input shaft rotation number such that it reaches substantially the final target input shaft rotation number $N_F$ (NO in step S15-3). In other words, unless the vehicle runs around a second specific corner which requires continuation of the control of the road information shift control device 45, the downshift control in which the shifting speed v is set to be smaller is continued.

In other words, the shift control means 45, 46 calculates the target input shaft rotation number (the corner target input shaft rotation number $N_C$) which is intermittently calculated at the start of calculation. This calculation is executed after switching from the predetermined target input shaft rotation number (the fundamental target input shaft rotation number $N_B$) calculated based on the vehicle state information, to the predetermined target input shaft rotation number calculated based on the road information (the corner target input shaft rotation number $N_C$) (a switch from the normal control in step S14 to the cornering control). Alternatively, the shift control device 45, 46 calculates within the predetermined time (within the predetermined time up until the corner is passed) the target input shaft rotation number (the corner target input shaft rotation number $N_C$ calculated according to a specific corner ahead of the vehicle which is intermittently detected) which is intermittently calculated during the continuation of control based on the road information. The calculation is executed once the input shaft rotation number has reached substantially the predetermined target input shaft rotation number (the final target shaft rotation number $N_F$).

In addition, when the control of the shifting speed control means 41 starts, the shifting speed setting means 44 sets the shifting speed v to the predetermined shifting speed before the input shaft rotation number reaches substantially the target input shaft rotation number for when the control based on the road information is started (the corner target input shaft rotation number $N_C$). When it is necessary to execute control such that the input shaft rotation number becomes equal to the target input shaft rotation number during the continuation of the control based on the road information (the corner target input shaft rotation number $N_C$ calculated according to a specific corner ahead of the vehicle which is intermittently detected), it is determined that shifting needs to be executed during control by the shifting speed control means 41, the shifting speed v is set to be smaller than the predetermined shifting speed.

In this way the shifting speed setting means 44 sets the shifting speed v such that it is comparatively small when it is necessary to decelerate during the control by the road information shift control means 45. As a result, when it is necessary to decelerate during control by the road information shift control means 45, it is possible to rapidly decelerate. Accordingly, it is possible to apply engine brake in accordance with the expectations of the driver.

Furthermore, the downshift control detection means 45b which is part of the cornering control detection means (control detection means) 45a, detects the execution of control by the road information shift control means 45 with respect to the specific corner. As a result, it is possible to reliably detect that shifting needs to be executed while continuing control by the road information shift control means 45, based on the actual execution of control by the road information shift control means 45

Next, the return to the normal control from the downshift control by the road information shift control means 45, when the vehicle leaves the specific corner, will be explained. The road information shift control means 45 determines whether the elapsed time since the cornering control in-progress flag was turned from ON to OFF is within a predetermined time (for example, the time in which it is possible to return to the normal control from the cornering control by smoothly changing the shifting ratio), based on the determination of step S15-1. When the elapsed time since the cornering control in-progress flag was turned from ON to OFF does not exceed the predetermined time (YES in step S15-1), the road information shift control means 45 does not immediately return to the normal control. It is determined whether the final target input shaft rotation number $N_F$ is greater than the prior cycle transitional target input shaft rotation number $N_S$ (step S15-3), and when the final target input shaft rotation number $N_F$ is smaller than the prior cycle transitional target input shaft rotation number $N_S$ (NO in step S15-3), the determination result is output to the shifting speed control means 41.

At this time, the shifting speed setting means 44 calculates the shifting speed coefficient K such that it is smaller than the shifting speed coefficient K during normal control (step S15-7). In other words, the shifting speed v is calculated so as to be smaller than the normal shifting speed v which is set to be larger within the range that does not cause a sense of discomfort to the driver. The transitional target input shaft rotation number $N_S$ is then calculated based on the calculation result (step S15-8). In addition, shifting of the CVT 5 is executed such that the actual input shaft rotation number $N_{IN}$ becomes equal to the transitional target input shaft rotation number $N_S$ (step S15-9), and the sub-routine is returned (step S15-10). In other words, on the occasion of executing upshift control following the completion of the downshift control of the road information shift control device 45 and the passing of the corner (i.e., when the cornering control in-progress flag has turned OFF), the shifting speed setting device 44 sets the shifting speed v to be smaller than the normal shifting speed v. Then, upshift control is executed based on this shifting speed v. As a result, when returning from downshift control by the road information shift control device 45, the upshift is executed in a slow manner, and it is possible to satisfy the acceleration requirements expected by driver (i.e., requirements for acceleration of the vehicle acceleration change). Accordingly, it is possible to prevent the driver or the occupant from feeling any sense of discomfort.

Next, the normal control following the passing of the specific corner will be explained. When it is determined that a predetermined time has elapsed since the cornering control in-progress flag turned from ON to OFF (NO in step S15-1), the shifting speed coefficient K during normal control is calculated (step S15-2). Then, based on the calculated result, the transitional target input shaft rotation number $N_S$ is calculated (step S15-8). In addition, shifting of the CVT 5 is executed such that the actual input shaft rotation number $N_{IN}$ becomes equal to the transitional target input shaft rotation number $N_S$ (step S15-9), and the sub-routine is returned (step S15-10). Moreover, normal control continues as long as a specific corner is not detected ahead of the vehicle.

It should be noted that the term "second" which was not explained previously refers to the corner after the first specific corner. Even, for example, if the vehicle is approaching a third, a fourth, or a fifth corner, after the first specific corner, and the continuous control corner detection means 45d detects that each of these corners is a specific corner requiring control of the road information shift control means 45 to be continued as above, control is executed in the same way as for the second specific corner. Furthermore, the aforementioned numbers have been used for explanatory ease, and do not in any way affect the structure of the invention.

Figure 15A:
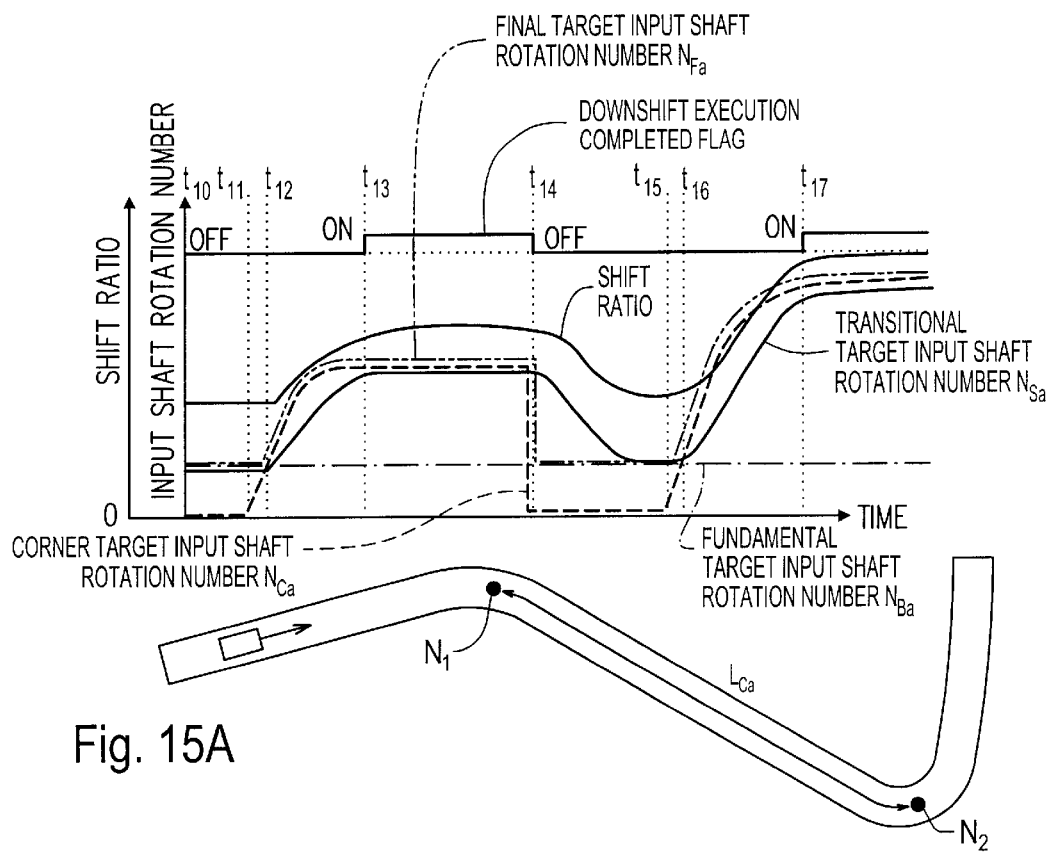
FIGS. 15(a) and 15(b) show running examples when the invention is applied with FIG. 15(a) showing a time chart when a distance between corners is long, and FIG. 15(b) showing a time chart when a distance between the corners is short.
Figure 15B:
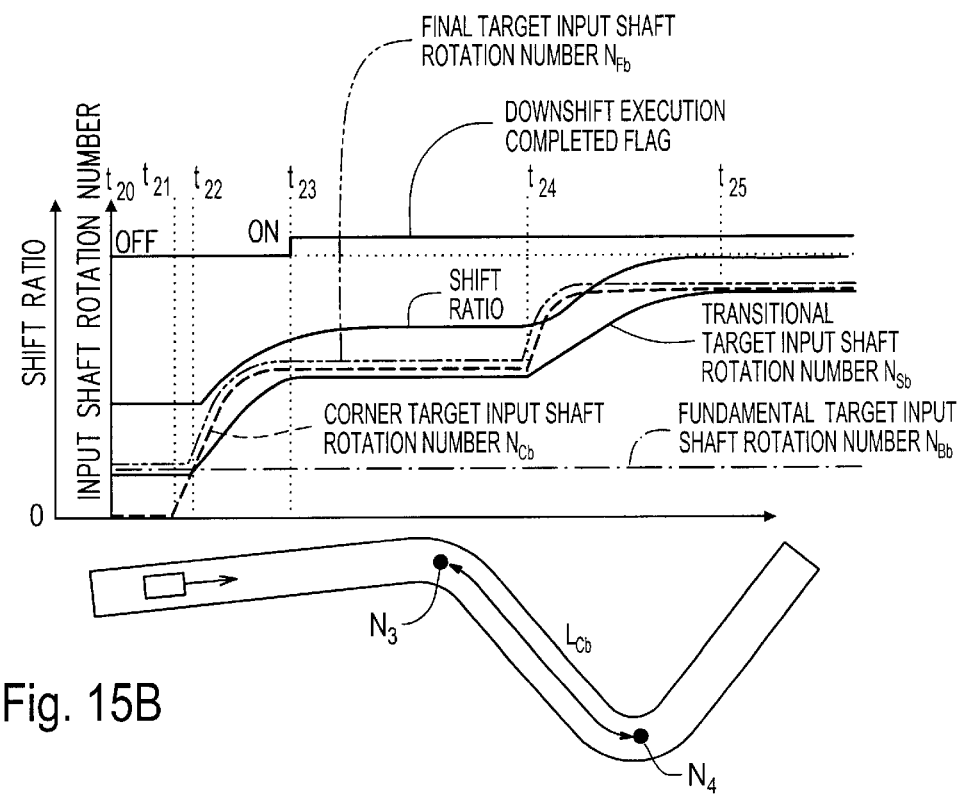
Figure 16A:
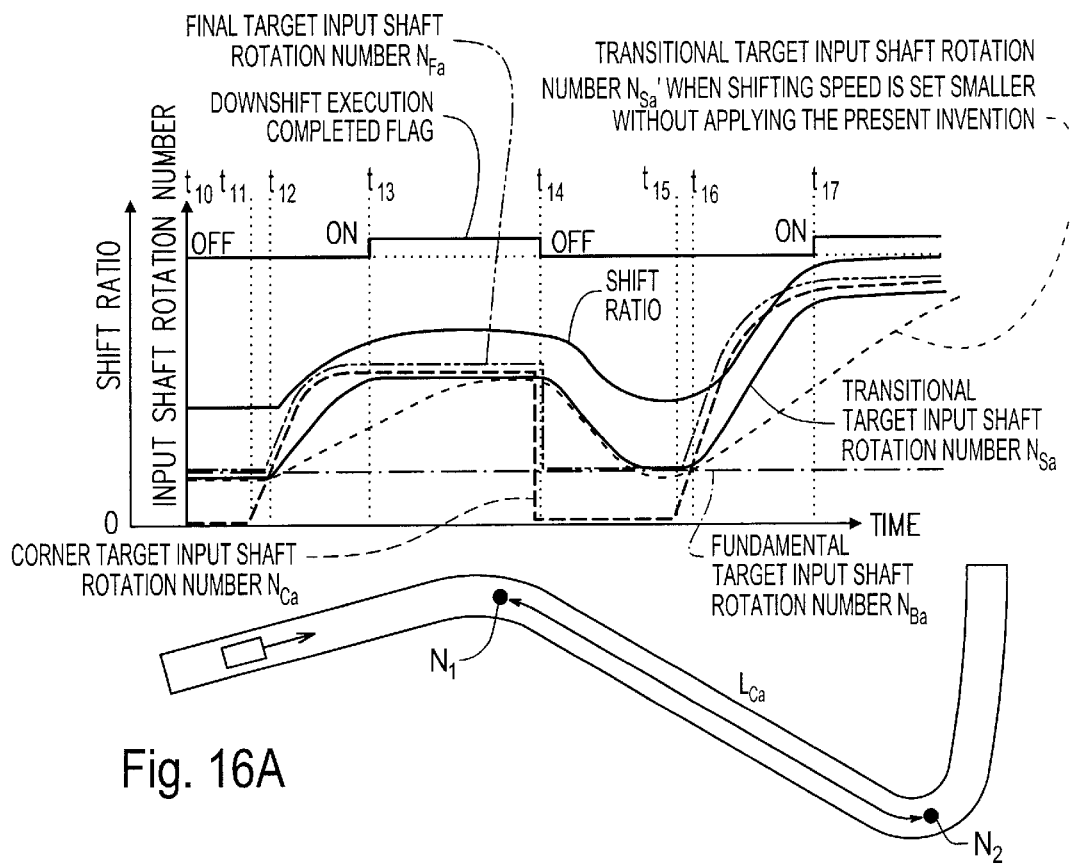
FIGS. 16(a) and 16(b) shows running examples when the invention is not applied with FIG. 16(a) showing a time chart when the distance between corners is long, and FIG. 16(b) showing a time chart when the distance between the corners is short.
Figure 16B:
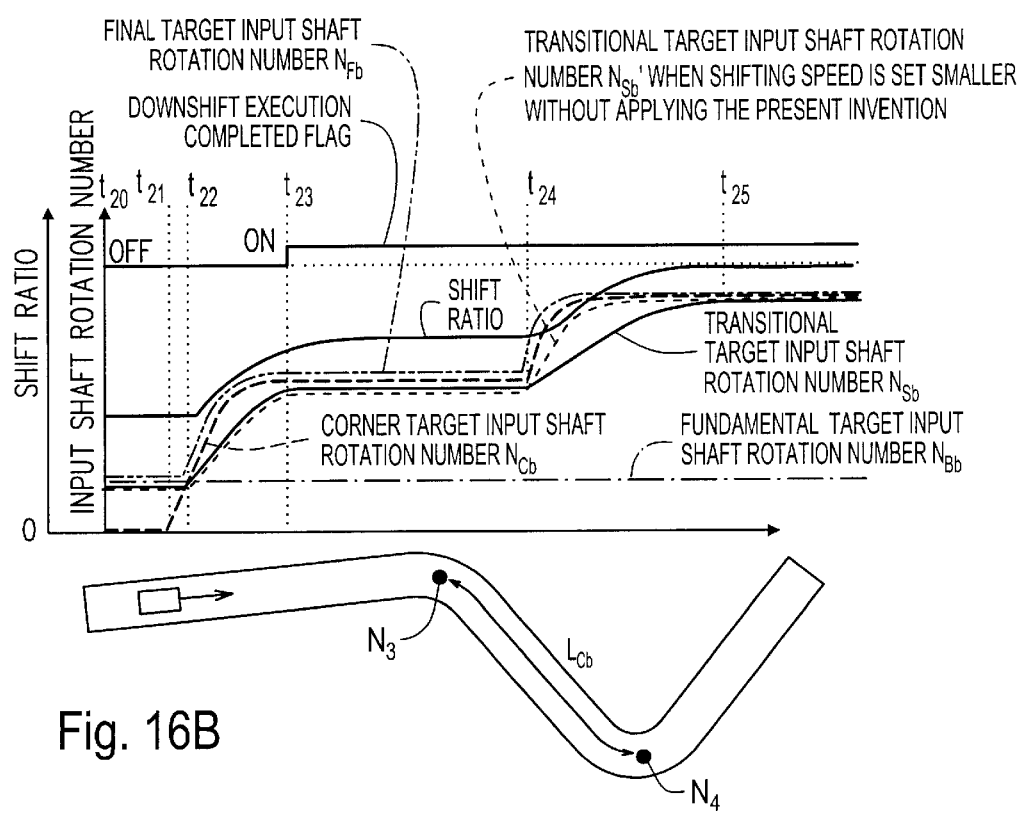

Next, a simple example of the running operation of the downshift control by the road information shift control means 45, based on the vehicle control apparatus 1 according to the embodiment of the invention, will be explained with reference to FIGS. 15(a)–16(b). FIGS. 15(a) and 15(b) shows running examples when the embodiment of the invention is applied with FIG. 15(a) showing a time chart when a distance between corners is long and FIG. 15(b) showing a time chart when the distance between the corners is short. FIGS. 16(a) and 16(b) show running examples when the embodiment of the invention is not applied, FIG. 16(a) showing a time chart when the distance between the corners is long, and FIG. 16(b) showing a time chart when the distance between the corners is short. Each figure shows time-dependent changes in the downshift execution completed flag ON and OFF state, the shift ratio, and each input shaft rotation number, in order from the top of the side axis. Furthermore, the running examples of FIG. 15(a) and FIG. 16(a) show hypothetical cases where the vehicle is entering corners which are exactly the same (the corner shape), and have the same road shape, for example, the same road gradient. Similarly, the running examples of FIG. 15(b) and FIG. 16(b) show similar hypothetical cases where the road information is exactly the same.

First, the running examples shown in FIG. 15(a) and FIG. 16(a) in which the distance Lca between the specific corners (node $N_1$ and node $N_2$) is long will be explained.

At time point t10, no specific corner ahead of the vehicle or deceleration intention (idle ON) has been detected (steps S13-2, S13-4, and NO in step S13-5), and thus the calculation of the corner target input shaft rotation number $N_{Ca}$ is not started and the corner target input shaft rotation number $N_{Ca}$ is at its initial value (0) (step S13-3). The fundamental target input shaft rotation number $N_{Ba}$ becomes the final target input shaft rotation number $N_{Fa}$ (step S14), and normal control is executed (NO in step S15-1, steps S15-2, S15-8 to S15-10). Furthermore, the transitional target input shaft rotation number $N_{Sa}$ shown by the solid line moves such that it is substantially equal to the final target input shaft rotation number $N_{Fa}$.

At time point t11, a specific corner or a deceleration intention (idle ON) is detected (steps S13-2, S13-4, and YES in step 13-5), the corner target input shaft rotation number $N_{Ca}$ is calculated (step S13-7), and the corner target input shaft rotation number $N_{Ca}$ begins to rise as shown by the dotted line.

At time point t12, when the corner target input shaft rotation number $N_{Ca}$ exceeds the fundamental target input shaft rotation number $N_{Ba}$ shown by the dash-dot line (a switch from the normal control to the cornering control), the final target input shaft rotation number selection means 48 selects the corner target input shaft rotation number $N_{Ca}$ as the final target input shaft rotation number $N_{Fa}$ (step S14), and the downshift control by the road information shift control means 45 starts (YES in steps S15-1 and 15-3 and NO in step S15-4).

On the other hand, in the running example shown in FIG. 16(a) when the embodiment of the invention is not applied, when shifting speed v is set to be smaller in advance on the occasion of downshift control, the gradient of the transitional target input shaft rotation number $N_{Sa}'$ shown by the thin dotted line rises gently. As a result, the transitional target input shaft rotation number $N_{Sa}'$ for the first specific corner (node $N_1$) does not rise rapidly, and engine braking force (vehicle acceleration change) in accordance with the expectations of the driver is not obtainable.

However, in the running example shown in FIG. 15(a) when the embodiment of the invention is applied, based on the detection result of the continuous control corner detection means 45d, the shifting speed setting means 44 calculates the shifting speed coefficient K for the first specific corner (node $N_1$). As a result, the shifting speed v is set to a predetermined shifting speed which is a comparatively large shifting speed (step S15-5), and thus the transitional target input shaft rotation number $N_{Sa}$ shown by the solid line changes to a large shifting speed v (gradient), and rises rapidly along with the shift ratio (shown by the thin line) (steps S15-8 to S15-10). Namely, the engine braking force increases rapidly such that it responds to the expectation of the driver.

In addition, at time point t13, the downshift control detection means 45b detects that the transitional target input shaft rotation number $N_{Sa}$ has reached substantially the final target input shaft rotation number $N_{Fa}$ (formula (4) above is satisfied), and the calculation of the corner target input shaft rotation number $N_{Ca}$ continues (NO in step S13-8, steps S13-7 to S13-11) until the vehicle has passed the specific corner. Accordingly, the continuous control corner detection means 45d turns the downshift execution completed flag to ON (formula (5) above is satisfied).

In the running example shown in FIG. 15(a) and FIG. 16(a) the distance Lca between the corners is long, and thus, at time point t14, the second specific corner (node 2) which requires the continuation of control by the road information shift control means 45 during the control of the road information shift control means 45 with respect to the first specific corner (node $N_1$) is not detected. Accordingly, it is determined that the corner has been passed (YES in step S13-8). As a result, the cornering control in-progress flag is turned OFF (step S13-9), and the corner target input shaft rotation number $N_{Ca}$ is initialized (to the initial value 0) (step S13-10). Namely, the final target input shaft rotation number $N_{Fa}$ decreases in a step-like manner and becomes equal to the fundamental target input shaft rotation number $N_{Ba}$ (step S14), and the continuous control corner detection means 45d turns the downshift execution completed flag to OFF (formula (5) above is not satisfied).

At time point t15, when the second specific corner (node $N_2$) or the idle ON is detected (steps S13-3, S13-4 and YES in step S13-5), the calculation of the corner target input shaft rotation number $N_{Ca}$ starts (step S13-7). At time point t16, the corner target input shaft rotation number $N_{Ca}$ exceeds the fundamental target input shaft rotation number $N_{Ba}$ and, thus, the corner target input shaft rotation number $N_{Ca}$ becomes the final target input shaft rotation number $N_{Fa}$ (step S14), and the downshift control by the road information shift control means 45 is executed.

At this time, the downshift execution completed flag is OFF (NO in step S15-4) and thus, similar to above, the transitional target input shaft rotation number $N_{Sa}$ rises rapidly along with the shift ratio (steps S15-5, S15-8 to S15-10). In addition, at time point t17 the transitional target input shaft rotation number $N_{Sa}$ reaches substantially the final target input shaft rotation number $N_{Fa}$, and the downshift execution completed flag is turned ON. On the other hand, in the running example shown in FIG. 16(a) when the invention is not applied, the transitional target input shaft rotation number $N_{Sa}'$ rises slowly in accordance with the shifting speed set in advance to be smaller, in a similar manner to above.

Next, the running examples shown in FIG. 15(b) and FIG. 16(b) in which the distance Lcb between the corners (nodes $N_3$ and $N_4$) is short will be explained. Furthermore, the time-dependent changes in the input shaft rotation number and the shift ratio are substantially the same between the time points t20 to t23 as between t10 and t12 in the aforementioned running examples of FIG. 15(a) and FIG. 16(a). Thus, this section of explanation will not be repeated.

At time point t24, prior to passing the first specific corner (node $N_3$), when a second specific corner (node $N_4$) within the predetermined range Ld along the scheduled running route of the vehicle is detected and the deceleration intention (idle ON) is detected (steps S13-2, S13-4 and YES in step S13-5), the calculation of corner target input shaft rotation number $N_C$ with respect to the second specific corner begins (step S13-7).

On the other hand, in the running example shown in FIG. 16(b) when the embodiment of the invention is not applied, when the shifting speed v is set to be large in advance, the gradient of the transitional target input shaft rotation number $N_{Sb}'$ for the second specific corner requiring continuation of control by the road information shift control means 45, shown by the thin dotted line, becomes steeper and the transitional target input shaft rotation number $N_{Sb}'$ rises rapidly. As a result, there is a possibility that the driver or the occupant will feel a sense of discomfort.

However, in the running example shown in FIG. 15(b) when the embodiment of the invention is applied, the shifting speed setting means 44 calculates a comparatively small shifting speed coefficient K based on the detection result of the continuous control corner detection means 45d. As a result, the shifting speed v is set to be comparatively smaller than the aforementioned predetermined shifting speed (step S15-6), and thus the transitional target input shaft rotation number $N_{Sa}$ rises slowly along with the shift ratio (step S15-6). Namely, the engine braking force increases slowly so as not to cause any sense of discomfort. In addition, at time point 25, the transitional target input shaft rotation number $N_{Sb}$ reaches substantially the final target input shaft rotation number $N_{Fb}$.

As described above, in the vehicle control apparatus 1 according to the embodiment of the invention, when starting control based on the road information after switching from control based on the vehicle state information from the shift control means 45, 46, the shifting speed setting means 44 sets the shifting speed to the predetermined shifting speed. When shifting needs to be executed during control based on the road information from the shift control means 45, 46, the shifting speed v is set to be lower than the predetermined shifting speed. Accordingly, the control by the shift control means 45, 46 can respond to differences in the expectation of the driver with respect to vehicle acceleration change magnitude (e.g., engine brake) depending on whether control based on the road information after switching from control based on the vehicle state information is starting, or control based on road information is being executed. As a result, it is possible to prevent the driver from feeling a sense of discomfort.

Furthermore, the shifting speed can be set differently depending on whether the corner the vehicle is running around is the first specific corner (specified corner) requiring control by the shift control means, or the second specific corner (specified corner) requiring control by the road information shift control means (shift control means) 45 to be continued. When the corner the vehicle is running around is the first specific corner (specified corner) requiring control by the road information shift control means (shift control means) 45, it is possible to generate large vehicle acceleration change (e.g., engine brake). Alternatively, when the corner is the second specific corner (specified corner) requiring control by the road information shift control means (shift control means) 45 to be continued, it is possible to generate small vehicle acceleration change. As a result, it is possible to respond to differences in the expectation of the driver with respect to vehicle acceleration change magnitude, depending on the corner which the vehicle is running around. As a result, it is possible to prevent the driver feeling a sense of discomfort.

Furthermore, the road information is information including at least one of the corner shape and the road gradient. It is possible to execute such that the input shaft rotation number becomes the final target input shaft rotation number $N_F$ control based on the road information. As a result, for example, it is possible to reliably respond to differences in the expectation of the driver with respect to the vehicle acceleration change magnitude (e.g., engine brake), depending on how gentle/sharp the corner is or the upward or downward gradient of the road. In addition, it is possible to slowly execute control of the shift ratio even when, for example, executing control of the shift ratio when running around the corner. Accordingly, it is possible to prevent the driver or the occupant of the vehicle, which is in the midst of turning, from feeling any sense of discomfort.

Moreover, the vehicle state information is information including at least one of the accelerator opening degree and the vehicle speed V. As a result, it is possible to execute control such that the input shaft rotation number becomes a predetermined target input shaft rotation number based on the information. Accordingly, it is possible to reliably respond to differences in the expectation of the driver with respect to vehicle acceleration change magnitude (e.g., engine brake), depending on, for example, the accelerator opening degree or the magnitude of the vehicle speed V.

Furthermore, according to the aforementioned embodiment, as an example of improving drivability, the road information shift control means (shift control means) 45 executes control such that the input shaft rotation number becomes a predetermined target input shaft rotation number calculated based on the road information. However, this is only an example and the invention is not limited thereto. For example, it is possible to further improve drivability by executing control of the input shaft rotation number using a target input shaft rotation number calculated based on driver factors, like the experience and the degree of vigilance of the driver.

In addition, according to the aforementioned embodiment, as an example of an operation indicating the intention of the driver to decelerate, the example of starting cornering control based on the accelerator OFF is used. However, the invention is not limited to this, and cornering control in which control starts prior to the accelerator OFF is possible. For example, it is also possible to apply the invention to so-called automatic driving control, based on running environment information.

Furthermore, the setting of the shifting speed v of the CVT 5 in the aforementioned embodiment has been explained. However, the CVT 5 is not limited to a belt-type continuous variable transmission, but may be, for example, a toroidal continuous variable transmission. It is also clearly apparent that the invention can be similarly applied to other types of continuous variable transmissions, such as, for example, the infinitely variable transmission (IVT), disclosed in Japanese Patent Application Laid-Open Publication No.8-261303, in which the output automatically converges on zero, or the hydrostatic transmission (HST). In addition, the invention can be applied to an apparatus which can control shifting to a predetermined shift ratio in a step-less manner, such as driving force control apparatus using motor generators in electric vehicles using driving sources, such as electric motors, or hybrid vehicles using driving sources, such as electric motors and engines. Moreover, the invention can similarly be applied to vehicles having an automatic transmission mounted, by setting the predetermined shift ratio to the nearest shifting speed. In this case, the invention can be applied by setting the speed (shifting speed v) at which the shift ratio changes.

In addition, in the aforementioned embodiment, the example is given of detection of the second specific corner requiring control of the road information shift control means 45 to be continued, based on the execution of the downshift control of the road information shift control means 45. However, the invention is not limited to this, and the second specific corner requiring control of the road information shift control means 45 to be continued may be detected using any method capable of such detection. For example, the second specific corner may be detected by using the navigation device 3 to set the second specific corner requiring control of the road information shift control means 45 to be continued as road information.

What is claimed is:

1. A vehicle control apparatus including an automatic transmission which changes a speed of rotation of an input shaft drivingly connected to a driving source and outputs the rotation of the input shaft to an output shaft, and shift execution means that executes shifting of the automatic transmission, comprising:

shift control means that calculates a predetermined target input shaft rotation number based on road information and vehicle state information, and controls an input shaft rotation number such that the input shaft rotation number becomes equal to the predetermined target input shaft rotation number, by executing shifting of the shift execution means; and shifting speed setting means that sets a shifting speed, when control based on the road information begins after switching from control based on the vehicle state information by the shift control means, to a predetermined shifting speed such that shifting is executed rapidly, and sets the shifting speed, when shifting needs to be executed during the control based on the road information by the shift control means, such that the shifting speed is lower than the predetermined shifting speed.

2. The vehicle control apparatus according to claim 1, wherein the shift control means has road information shift control means that calculates the predetermined target input shaft rotation number based on the road information, and controls the input shaft rotation number such that the input shaft rotation number becomes equal to the predetermined target input shaft rotation number by executing shifting of the shift execution means, and the vehicle control apparatus further comprises continuous control detection means that detects shifting needs to be executed while the control by road information shift control means is continued during the control by the road information shift control means, and the shifting speed setting means sets the shifting speed to a predetermined shifting speed such that shifting is executed rapidly when the control by the road information shift control means starts, and sets the shifting speed such that the shifting speed is lower than the predetermined shifting speed when shifting needs to be executed during the control by the road information control means, based on a detection result of the continuous control detection means.

3. The vehicle control apparatus according to claim 2, wherein the road information is information including at least one of a corner shape and a road gradient.

4. The vehicle control apparatus according to claim 2, wherein the vehicle state information is information including at least one of an accelerator opening degree and a vehicle speed.

5. The vehicle control apparatus according to claim 2, further comprising road information control detection means that detects the execution of control by the road information shift control means, wherein the continuous control detection means detects the need to execute shifting while the control by the road information shift control means is continued, based on a detection result of the road information control detection means.

6. The vehicle control apparatus according to claim 5, wherein the road information control detection means is downshift control detection means that detects execution of downshift control by the road information shift control means, the continuous control detection means detects the need to decelerate by continuing downshift control by the road information shift control means during the downshift control by the road information shift control means, based on a detection result of the downshift control detection means, and the shifting speed setting means sets the shifting speed, when control by the road information shift control means starts, to the predetermined shifting speed such that shifting is executed rapidly, and sets the shifting speed, when it is necessary to decelerate during the control by the road information shift control means, such that the shifting speed is lower than the predetermined shifting speed, based on the detection result of the continuous control detection means.

7. The vehicle control apparatus according to claim 6, wherein the shifting speed setting means sets on the occasion of executing upshift control, when the downshift control by the road information shift control means is completed and a corner is passed, the shifting speed such that the shifting speed is lower than a normal shifting speed.

8. The vehicle control apparatus according to claim 2, wherein the shift control means calculates the predetermined target input shaft rotation number when an operation indicating an intention of a driver to decelerate is detected.

9. The vehicle control apparatus according to claim 8, further comprising an accelerator sensor that detects one of an on and an off state of an accelerator pedal, wherein the shift control means calculates the predetermined target input shaft rotation number when the accelerator sensor detects the off state of the accelerator pedal.

10. The vehicle control apparatus according to claim 8, further comprising a throttle opening sensor that detects a degree of opening of a throttle valve, wherein the shift control means calculates the predetermined target input shaft rotation number when the throttle opening sensor detects a predetermined opening degree of the throttle valve.

11. The vehicle control apparatus according to claim 2, wherein the shift control means calculates one of a target input shaft rotation number which is intermittently calculated at a start of the control based on the road information after switching from the predetermined target input shaft rotation number calculated based on vehicle state information to the predetermined target input shaft rotation number calculated based on the road information, and the target input shaft rotation number which is intermittently calculated during continuation of the control based on the road information, the calculation of the latter being executed within a predetermined time once the input shaft rotation number has reached substantially the predetermined target input shaft rotation number by the shift control means, and the shifting speed setting means sets the shifting speed, when the control by the shift control means starts, to the predetermined shifting speed before the input shaft rotation number reaches substantially the target input shaft rotation number for when the control based on the road information is started, and when control needs to be executed such that the input shaft rotation number becomes equal to the target input shaft rotation number during continuation of the control based upon the road information, it is determined that shifting needs to be executed during execution of the continuous control by the shift control means, and the shifting speed control means sets the shifting speed such that the shifting speed is lower than the predetermined shifting speed.

12. A vehicle control apparatus including an automatic transmission which changes a speed of rotation of an input shaft drivingly connected to a driving source and outputs the rotation of the input shaft to an output shaft, and a shift execution means that executes shifting of the automatic transmission, comprising:

shift control means that calculates a predetermined target input shaft rotation number with respect to a first specified corner based on road information and vehicle state information, and controls an input shaft rotation number such that the input shaft rotation number becomes equal to the predetermined target input shaft rotation number, by executing shifting of the shift execution means;

continuous control corner detection means that detects a second specified corner requiring control by the shift control means to be continued during the control with respect to the first specified corner; and shifting speed setting means that sets a shifting speed, based on a detection result of the continuous control corner detection means, such that the shifting speed for the first specified corner requiring the control by the shift control means is different from the shifting speed for the second specified corner requiring the control by the shift control means to be continued.

13. The vehicle control apparatus according to claim 12, wherein the shifting speed setting means sets the shifting speed, based on a detection result of the continuous control corner detection means, to a predetermined shifting speed such that shifting is executed rapidly when a vehicle is running around the first specified corner requiring the control by the shift control means, and sets the shifting speed such that the shifting speed is lower than the predetermined shifting speed when the vehicle is running around the second specified corner requiring the control by the shift control means to be continued.

14. A vehicle control method for executing shifting of an automatic transmission which changes a speed of rotation of an input shaft drivingly connected to a driving source and which outputs the rotation of the input shaft to an output shaft, comprising the steps of:

calculating a predetermined target input shaft rotation number based on road information and vehicle information;

controlling an input shaft rotation number such that the input shaft rotation number becomes equal to the predetermined target input shaft rotation number by execution of shifting of the automatic transmission; and setting a shifting speed to a predetermined shifting speed such that shifting is executed rapidly when the control of the input shaft rotation number begins, and setting the shifting speed such that the shifting speed is lower than the predetermined shifting speed when shifting needs to be executed during the control of the input shaft rotation number.

15. The vehicle control method according to claim 14, further comprising detecting shifting needs to be executed while the controlling the input shaft number is continued and the shifting speed is set to a predetermined shifting speed such that shifting is executed rapidly when the controlling starts, and setting the shifting speed such that the shifting speed is lower than the predetermined shifting speed when shifting needs to be executed during the controlling based on the detecting shifting needs to be executed.

16. The vehicle control method according to claim 15, wherein the road information is information including at least one of a corner shape and a road gradient.

17. The vehicle control method according to claim 15, wherein the vehicle state information is information including at least one of an accelerator opening degree and a vehicle speed.

18. A vehicle control method for executing shifting of an automatic transmission which changes a speed of rotation of an input shaft drivingly connected to a driving source and outputs the rotation of the input shaft to an output shaft, and executes shifting of the automatic transmission, comprising:

calculating a predetermined target input shaft rotation number with respect to a first specified corner based on road information and vehicle state information;

controlling an input shaft rotation number such that the input shaft rotation number becomes equal to the predetermined target input shaft rotation number, by executing shifting of the shift execution means;

detecting a second specified corner requiring control to be continued during the control with respect to the first specified corner; and setting a shifting speed, based on the detecting result such that the shifting speed for the first specified corner requiring the control is different from the shifting speed for the second specified corner requiring the control to be continued.

19. The vehicle control method according to claim 18, wherein the setting of the shifting speed, based on the detecting result, to a predetermined shifting speed such that shifting is executed rapidly when a vehicle is running around the first specified corner requiring the controlling and sets the shifting speed such that the shifting speed is lower than the predetermined shifting speed when the vehicle is running around the second specified corner requiring the controlling to be continued.

20. A vehicle program for causing an automatic transmission which changes a speed of rotation of an input shaft drivingly connected to a driving source and which outputs the rotation of the input shaft to an output shaft, and a vehicle control computer for executing shifting of the automatic transmission, to function as:

shift control means that calculates a predetermined target input shaft rotation number based on road information and vehicle state information, and controls an input shaft rotation number such that the input shaft rotation number becomes equal to the predetermined target input shaft rotation number, by executing control of the automatic transmission; and shifting speed setting means that sets a shifting speed to a predetermined shifting speed such that shifting is executed rapidly when the control by the shift control means starts, and sets the shifting speed such that the shifting speed is lower than the predetermined shifting speed when shifting needs to be executed during the control by the shift control means.

* * * * *